(12) United States Patent
Schmeder

(10) Patent No.: US 12,529,914 B2
(45) Date of Patent: Jan. 20, 2026

(54) NIGHT DRIVING EYEWEAR DEVICE WITH GRADIENTLY DISPOSED OPTICAL FILTERING LENSES AND METHODS OF USE THEREOF

(71) Applicant: Andrew Schmeder, Richmond, CA (US)

(72) Inventor: Andrew Schmeder, Richmond, CA (US)

(73) Assignee: Proaxient Technologies LLC, Richmond, CA (US)

( * ) Notice: Subject to any disclaimer, the term of this patent is extended or adjusted under 35 U.S.C. 154(b) by 0 days.

(21) Appl. No.: 18/492,697

(22) Filed: Oct. 23, 2023

(65) Prior Publication Data

US 2025/0093685 A1    Mar. 20, 2025

Related U.S. Application Data

(60) Provisional application No. 63/418,917, filed on Oct. 24, 2022.

(51) Int. Cl.
G02C 7/10    (2006.01)

(52) U.S. Cl.
CPC ............. *G02C 7/104* (2013.01); *G02C 7/105* (2013.01)

(58) Field of Classification Search
CPC ......... G02C 7/104; G02C 7/105; G02C 7/107
See application file for complete search history.

(56) References Cited

U.S. PATENT DOCUMENTS

| 805,401 A | 11/1905 | Zarbaugh |
| 1,505,882 A | 8/1924 | Geiger |

(Continued)

FOREIGN PATENT DOCUMENTS

| FR | 2684771 | 6/1993 |
| FR | 2722581 | 1/1996 |
| WO | 2006024051 | 3/2006 |

OTHER PUBLICATIONS

Mace D, Garvey P, Porter R, Schwab R, Adrian W. Countermeasures for Reducing the Effects of Headlight Glare. Washington, DC: AAA29 Foundation for Traffic Safety; 2001. doi:10.1037/e579652007-001.

(Continued)

*Primary Examiner* — Tuyen Tra
(74) *Attorney, Agent, or Firm* — My Patent Guys; Christopher Pilling

(57) ABSTRACT

A spectacle eyewear device and methods for using a spectacle eyewear device to attenuate glare experienced by a person while driving a car during nighttime hours. The lenses of the spectacle eyewear device provide spatially non-uniform light attenuation using an optical filtering material that is gradiently disposed along an gradient axis oriented between 10 degrees to 30 degrees away from the vertical axis of the lenses. In some variations the average visible light transmittance in a first quadrant of the lenses is less than 30 percent and is greater than 70 percent in a second quadrant. In some variations the lenses comprise a selectively disposed blue-light reflective coating. In some variations the spectacle eyewear device is configured for use on urban city streets and freeways. In some variations the spectacle eyewear device is configured for use on country roads and two-lane highways.

19 Claims, 12 Drawing Sheets

(56) References Cited

U.S. PATENT DOCUMENTS

| | | |
|---|---|---|
| 1,545,978 A | 7/1925 | Rollins |
| 1,643,509 A | 9/1927 | Moran |
| 1,685,725 A | 9/1928 | Augustus |
| 1,706,429 A | 3/1929 | Willard |
| 2,012,620 A | 8/1935 | Bean et al. |
| 2,109,115 A | 2/1938 | Kleine |
| 2,286,219 A | 6/1942 | Anthony |
| 2,858,539 A | 11/1958 | Philip |
| 2,861,496 A | 11/1958 | Thornton |
| 4,023,892 A | 5/1977 | Smith |
| 4,229,082 A | 10/1980 | Carreau |
| 4,298,991 A | 11/1981 | Recenello |
| 4,859,047 A | 8/1989 | Badewitz |
| 5,251,334 A | 10/1993 | Yang |
| 5,252,997 A | 10/1993 | Christenbery |
| 5,428,409 A | 6/1995 | Silverstein |
| 5,548,491 A | 8/1996 | Karpen |
| 5,844,721 A | 12/1998 | Karpen |
| 5,877,837 A | 3/1999 | Hayes |
| 6,056,397 A | 5/2000 | Berlad |
| 6,450,636 B1 | 9/2002 | Ylipelkonen |
| 6,575,569 B1 | 6/2003 | Castellano |
| 7,264,352 B2 | 9/2007 | Anthony |
| 7,306,331 B1 | 12/2007 | Tigert |
| 8,192,021 B2 | 6/2012 | Giraudet |
| 8,602,554 B2 | 12/2013 | Lau |
| 2024/0288715 A1* | 8/2024 | Tullo .................. G02C 7/12 |

OTHER PUBLICATIONS

Mainster MA, Turner PL. Glare's causes, consequences, and clinical challenges after a century of ophthalmic study. Am J Ophthalmol. Apr. 2012;153(4):587-93. doi: 10.1016/j.ajo.2012.01.008. PMID: 22445628.

* cited by examiner

NIGHT DRIVING EYEWEAR DEVICE WITH GRADIENTLY DISPOSED OPTICAL FILTERING LENSES AND METHODS OF USE THEREOF

BACKGROUND OF THE INVENTION

1. Field of the Invention

The invention relates eyewear configured for reducing glare experienced by a person while driving a car during nighttime hours.

2. Description of Related Art

The invention of headlights dates to the 1880s, approximately concurrent with the time of the first automobiles. Headlights enable vehicles to be operated during night-time hours, however the intense beam of light projected by vehicle headlights causes the drivers of other vehicles to experience glare. Glare causes discomfort to the eyes and can have a disabling effect on human vision. Night-time driving glare countermeasures comprise devices and methods including glare-blocking roadway dividers, headlight beam masking and aiming standards, auto-dimming and prism-based switchable anti-glare rear-view mirrors, and night-time driving eyewear. A summary of these and other devices and methods for reducing night-time driving glare is provided by Mace, Douglas, et al. "Countermeasures for reducing the effects of headlight glare." *American Automobile Association Foundation for Traffic Safety* (2001).

Night-time driving eyewear reduce glare by attenuating the intensity of light reaching the driver's eye. The most common type of such eyewear uses an optical filter to selectively attenuate short-wavelength light, also called "blue" light. Blue light comprises light having a wavelength between 400 nanometers to 500 nanometers. It is generally known that for monochromatic lights of equal photopic intensity, wavelengths of blue light cause a greater amount of glare discomfort compared to green, yellow and red wavelengths of light between 501 nanometers to 700 nanometers.

When formed using absorptive optical filtering materials, blue-blocking optical filters have yellow or orange appearance. When manufactured using reflective optical filtering materials, a blue-blocking filter may have a shiny blue appearance. Optical filters may be formed from absorptive filtering materials, or from reflective filtering materials, or from a combination of absorptive and reflective filtering materials. Generally, to be useful for night-time use, the lenses of eyewear comprising an optical filtering material transmit an overall visible light transmittance (VLT) that is greater than or equal to 75 percent. Visible light transmittance is the photopic sensitivity-weighted percentage of light transmitted by an optical filter.

The most common type of night driving eyewear sold in the market today consist of eyewear with lenses comprising absorptive optical materials that uniformly attenuate blue-light and have a visible light transmittance of approximately 75 percent. Uniform attenuation means that the lenses provide substantially the same spectral transmittance at all points on the lens. Lenses may also incorporate polarization, however the addition of polarization filtering provides minimal improvement because headlights are non-polarized light sources. Night-time driving lenses may also comprise anti-reflection coatings, which serve to increase the visible light transmittance of the lenses by around 600 to 800 basis points.

In spite of the widespread commercial availability of blue-light attenuating eyewear with uniformly attenuating lenses, vision science researchers have noted that uniform attenuation of light comes with an undesirable side effect of reduced visibility of non-glare sources.

In "Glare's Causes, Consequences, and Clinical Challenges After a Century of Ophthalmic Study" by Mainster et al. published 2012-04 in American Journal of Ophthalmology, Vol. 153, Issue 4, pages 587-593, summarizes relevant historical and contemporary publications on glare from the fields of ophthalmology, illumination engineering, neurology and others. The results of the analysis include that "Colored spectacle or intra-ocular lens filters reduce both [glare and non-glare visual information] proportionately, so they do not increase retinal image contrast or decrease disability glare . . . . Optical glare countermeasures are available for daytime driving but not oncoming automobile headlights at night. Filters that decrease . . . dazzling glare also reduce nighttime mesopic and scotopic sensitivity . . . . Glare is problematic for patients and clinicians despite a century of scientific research". Furthermore, Mace, Douglas, et al. note that, "research yields no real support for the use of fully tinted [i.e., uniformly tinted] glare-blocking glasses as a means of achieving safer nighttime driving".

For over one hundred years, inventors have attempted to create eyewear designs that mitigate the negative side effects of glare while driving. However, these past attempts have failed to achieve widespread commercial adoption. To better understand the problem, the inventor performed a review of prior art and contemplated the obstacles that may have prevented the commercial success of the prior design strategies.

The first and oldest inventions for improved driving eyewear comprise eyewear constructed with various forms of extension shades, blinders or shields. One advantage of designing an eyewear device with extension shades is the shades can be capable of being translated or rotated by the user to optimize the placement of the selective light attenuating or light shading member.

In one example of an eyewear with an extension eye shade, U.S. Pat. No. 805,401A by Zarbaugh filed 1904 Jun. 15 discloses a goggle with "extension eye shades" positioned above and on the left hand side of a pair of spectacle lenses. The size and position of the eye shield limits the entry of light into the wearer's eyes from "unusual angles". The inventor noted that Zarbaugh's device has a number of negative consequences including significant added weight of the extension eye shades and the opaque nature of the eye shades causing a total loss of visibility of shaded portions of the field of view.

In another example, U.S. Pat. No. 1,505,882A by Geiger filed 1921 Sep. 26 discloses a spectacle frame wherein translucent eye shields are mounted to the front of the device and can be pivoted to attenuate light arriving from the left periphery of the wearer. The use of translucent shields improves on the invention of Zarbaugh with respect to the total loss of visibility in the shaded portion of view, however issues of excessive weight remain, and new problems related to undesired refraction and reflection of light by the translucent shield may be introduced.

In another example, U.S. Pat. No. 1,685,725A by Augustus filed 1926 Dec. 14 discloses a pair of spectacle lenses having a rotatable translucent shield affixed to the outer left side of each lens.

In another example, U.S. Pat. No. 2,286,219A by Anthony filed 1938 Jul. 28 discloses an anti-dazzle device analogous to a the slats of Venetian blinds, arranged vertically so that the slats block rays of light arriving from peripheral directions to the right and left. Anthony summarizes other methods of glare management including tinted windscreens and pivoting blinders.

In another example, U.S. Pat. No. 2,861,496A by Thornton filed 1954 Jun. 17 discloses a spectacle frame with a pair of rotating shields mounted on in front of the lenses enabling the wearer to position the shield to cause a sharp dividing line in the wearers vision. The shield may be semi-transparent. The shield may have an inclined angle (for example as shown in Thornton U.S. Pat. No. 2,861,496A FIG. 2). Thornton discusses the advantages of a sharp dividing line in that it enables the wearer to increase the attenuation of oncoming headlines with a slight head movement to the right.

In another example, U.S. Pat. No. 2,858,539A by Philip filed 1957 Sep. 25 discloses an opaque shield that is attached to the temple-bar of conventional eyeglass frames. The opaque shield protrudes in front of the spectacle lenses and shadows the view on one side of the wearer's vision.

In another example, U.S. Pat. No. 4,298,991A by Recenello filed 1980 Jul. 28 discloses a spectacle frame with blinders that are pivotally attached to each temple-bar and capable of rotating between two positions. In the forward position the shield protrudes in front of the spectacle lenses and attenuates the entry of light from the peripheral vision on one or both sides of the wearer.

In another example, U.S. Pat. No. 5,251,334A by Yang filed 1990 Jul. 10 discloses a headband mounted eye shield positioned on the temporal side of the eyes nearest to oncoming traffic.

In another example, U.S. Pat. No. 5,877,837A by Hayes filed 1996 Nov. 4 discloses a device for attenuating glare sources originating from rear-view side mirrors of a vehicle; the device comprising side shields attached on the both sides of the temple bars of ordinary glasses and substantially behind the front of the primary eyewear lenses. The inventor evaluated the invention of Hayes by sitting in the driver's seat of a car while wearing glasses and noted that unless the glasses were particularly small in size, the driver's side mirror was actually seen through the lenses of the frame, and not proximal to the temple bar. Therefore, the utility of a side shield attached to the temple bar of eyewear is unlikely to enjoy commercial success.

The aforementioned eyewear designs incorporating shading members or blinders are impractical: the resulting device is heavy, fragile, difficult to clean and maintain, and difficult to learn to use properly.

Continuing with the review of prior inventions, the inventor reviewed prior patents describing a lens with one or more regions of optical filtering material configured in such a way that a relatively greater amount of light attenuation occurs inside the region, when compared to the lens transmission outside the region. Such regions may be disposed on or within the lenses of an eyewear device, or may be disposed using a second pair of lenses such as using a "clip-on" system or "fit-over" frame.

In one example of a multi-region lens design, U.S. Pat. No. 1,545,978A by Rollins filed 1923 Oct. 31 discloses a pair of spectacle lenses comprising two regions: a square region of translucent material positioned in the upper left corner of each lens, and a circular region comprising the remaining area of the lens, where the larger circular region is transparent or translucent of a different tint density. The anti-glare region may be used by the wearer rotating their head to bring the square region toward the center of their field of view, and thereby attenuating blocking light from an oncoming glare source.

In another example, U.S. Pat. No. 1,643,509A by Moran filed 1925 Aug. 14 discloses a pair of tinted spectacle lenses each having a transparent bean-like shaped region located on the right peripheral side of each lens.

In another example, U.S. Pat. No. 1,706,429A by Willard filed 1926 Jul. 23 discloses driving glasses having a translucent and a transparent portion. The translucent portion comprises the upper portion of the lens that extends horizontally across a line having a feature analogous to a step where the step results in a lowered translucent portion over the left-hand side of the lens (from the wearer's perspective). A similar "stepped" design appears in U.S. Pat. No. 3,092,838A by Vacha filed 1961 Dec. 12.

In another example, U.S. Pat. No. 2,012,620A by Bean filed 1934 Aug. 30 discloses an eyewear device for reducing glare from headlights comprising a horizontally oriented translucent segment positioned substantially above the optical axis, which deviates downward to below the optical axis toward the left temporal side of each lens (i.e. on the side of oncoming traffic).

In another example, U.S. Pat. No. 2,109,115A by Klein filed 1935 Jul. 29 discloses an eyewear device comprising lenses with "bean-shaped" regions positioned substantially horizontally and above the optical axis of the wearer.

In another example, U.S. Pat. No. 4,023,892A by Smith filed 1969 Nov. 20 discloses an eyewear device where a vertically oriented segment is provided to attenuate glare from oncoming traffic only to the eye most distant from the lane of oncoming traffic (i.e. the eye shield is applied to the right eye only in US standard roadway configuration). By leaving the left eye unprotected Smith speculates the side effects of reduced visibility caused by blocking half the field of view of the other eye will be neutralized.

In another example, U.S. Pat. No. 4,229,082A by Carreau et al. filed 1977 May 6 discloses a pair of spectacle lenses for use while driving at night having three zones of filtration; a central zone that is transparent, an annular zone that is partially translucent, and a peripheral zone comprising substantially the outward left and right sections of the lens providing a lesser amount of light attenuation to rays of light entering from temporal angles on both sides of the field of view.

In another example, U.S. Pat. No. 4,859,047A by Badewitz filed 1987 Mar. 30 discloses an eyewear device having a translucent band positioned across the upper portion of the field of view so that the wearer is able to tilt their head downward by a small angle to cause the brightness of oncoming headlights to be attenuated by the optical translucent band.

In another example, U.S. Pat. No. 5,252,997A by Christenbery filed 1991 May 14 discloses an eyewear device wherein the lenses have two regions for glare reduction including a direct glare attenuation area comprising a laterally disposed segment across each lens and positioned above the optical axis, and a second portion configured to attenuate glare arriving from the peripheral driver's side rear-view mirror comprising a vertically oriented segment positioned on the left-hand side (driver's side) of each lens.

In another example, U.S. Pat. No. 5,428,409A by Silverstein filed 1991 Nov. 14 discloses an eyewear device comprising a pair of spectacle lenses wherein the upper portion of the lens attenuates glare and is positioned approximately 5 mm above the optical center of the lens. The user is able to block glare by tilting their head downward thus bringing the anti-glare filtering region of the into the central field of view.

In another example, FR2684771A1 by Michel filed 1991 Dec. 5 discloses an eyewear device comprising a pair of spectacle lenses for improving vision while driving, including by night, wherein the lens has a two-color gradient tint such that the upper portion of the lens is tinted yellow and the lower portion of the lens is tinted purple.

In another example, FR2722581A1 by Christophe filed 1994 Jul. 13 discloses a gradient polarizing lens for attenuating glare under night time driving conditions, wherein the lens provides three horizontally disposed zones each having a different amount of polarization.

In another example, U.S. Pat. No. 6,056,397A by Berlad filed 1998 Oct. 6 discloses an eyewear device comprising a pair of spectacle lenses having a segmented region for glare attenuation comprising a horizontal segment across the lens and above the optical axis and a perspective segment extending downward at an obtuse angle toward the driver's side portion of the field of view. The filtering comprises tinting, polarized elements or a combination of both.

In another example, U.S. Pat. No. 6,450,636B1 by Ylipelkonen filed 2000 Oct. 2 discloses an eyewear device comprising a pair of anti-glare lenses capable of being attached to the front of ordinary eyeglasses with a mechanism that enables variable positioning of the anti-glare lenses. The anti-glare lenses comprise a transparent and translucent glare-reducing areas. In one embodiment, the transparent area comprises a triangular region extending downward from the optical center of each lens.

In another example, U.S. Pat. No. 6,575,569B1 by Castellano filed 2002 Jun. 17 discloses an eyewear device wherein each lens has a lateral gradient of tint distributed along a horizontal axis and the darker side of the gradient is positioned on both lenses on the left side of the lens so that it reduces the intensity of lights from oncoming traffic. An embodiment of the invention also comprises a light attenuating side shield attached below the temple-bar of the eyewear configured to attenuate light arriving from the driver's side outside rear-view mirror.

In another example, WO2006024051A1 by Germishuys filed 2004 Aug. 22 discloses an eyewear device comprising lenses with a glare attenuating segment in the shape of a "half moon" positioned above the eyes of the wearer, so that it is capable of attenuating glare from above, and to the left and to the right of the wearer by means of slight head movements.

In another example, U.S. Pat. No. 7,264,352B2 by Anthony filed 2005 Oct. 20 discloses an eyewear device comprising a pair of spectacle lenses having an opaque or translucent mask positioned at an angle between the clock positions of 7:30 to 12:30 and passing above the optical center of the lens so that light from the oncoming traffic to each eye may be substantially blocked by slight motions of the wearer's head.

In another example, U.S. Pat. No. 8,602,554B2 by Lau et al. filed 2006 Sep. 20 discloses an eyewear device comprising lenses with a substantially transparent center portion and an attenuating peripheral portion in the form of an annulus centered around the transparent central portion.

In another example, U.S. Pat. No. 7,306,331B1 by Tigert filed 2006 Oct. 6 discloses an eyewear device wherein each lens has a light attenuating translucent region of a triangular shape to "map onto" the view of the lane of opposing traffic. In its method of use the wearer is able to rotate the light-attenuating filtering region into their view by tilting their head downward by an angle of about twenty degrees.

In another example, U.S. Pat. No. 8,192,021B2 by Giraudet filed 2006 Nov. 17 discloses an ophthalmic lens comprising a central yellow zone surrounded by a peripheral zone absorbing a substantially greater portion of light of wavelengths less than 600 nm, and optionally a third zone which is colorless, grey or brown in the lower part of the lens.

In another example, U.S. Pat. No. 5,548,491 by Karpen (1996) and U.S. Pat. No. 5,844,721 by Karpen (1996) propose adding spectral selectivity to headlights and/or rearview mirrors by incorporation of neodymium oxide into the glass, with the theory being that yellow light between 580 nanometers to 600 nanometers contributes more to glare sensation than other wavelengths of light.

In spite of these and many other inventive disclosures in the prior art, to the inventor's current knowledge, virtually all night driving eyewear sold on the market today consist of blue-blocking lenses with uniform attenuation only. The need for improved eyewear for night time driving that is commercially viable and accepted by consumers remains an unsolved problem. Consequently, a solution is provided herein.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In a first aspect, the invention comprises a spectacle eyewear device comprising a first lens and a second lens and a spectacle frame, wherein each of the lenses comprises a lens substrate and a optical filtering material that is gradiently disposed across each lens along a gradient axis, whereby the lenses are each mounted in the spectacle frame such that the gradient axis is oriented between 10 degrees to 30 degrees away from the vertical axis of each lens, and the gradient axes of the lenses are substantially parallel to each other, and such that the maximum rate of change of visible light transmission of each lens along a gradient axis is between 100 to 400 basis points per millimeter, and an average visible light transmittance in the upper temporal quadrant of the first lens is less than or equal to 30 percent, and an average visible light transmittance in the lower nasal quadrant of the first lens is greater than or equal to 70 percent, and an average visible light transmittance in the upper nasal quadrant of the second lens is less than 30 percent, and an average visible light transmittance in the lower temporal quadrant of the second lens is greater than or equal to 70 percent.

In some variations, an average mean spectral transmittance between 430 nanometers to 470 nanometers in the upper temporal quadrant of the first lens is less than or equal to 20 percent and an average mean spectral transmittance between 550 nanometers to 650 nanometers in the lower nasal quadrant of the first lens is greater than or equal to 80 percent; and, an average mean spectral transmittance between 430 nanometers to 470 nanometers in the upper nasal quadrant of the first lens is less than or equal to 20 percent and an average mean spectral transmittance between 550 nanometers to 650 nanometers in the lower temporal quadrant of the first lens is greater than or equal to 80 percent.

In some variations, the lens substrates each comprise a uniformly disposed optical filtering material that is configured such that a mean spectral transmittance between 430 nanometers to 470 nanometers of the lens substrates is less than or equal to 30 percent, and a mean spectral transmittance between 550 nanometers to 650 nanometers of the lens substrates is greater than or equal to 80 percent.

In some variations, the lenses comprise a uniformly disposed blue-light reflective upon the convex surface of each lens wherein the blue-light reflective coating has a mean spectral reflectance between 430 nanometers to 470 nanometers that is greater than 30 percent and a mean spectral reflectance between 550 nanometers to 650 nanometers that is less than 15 percent.

In some variations, the lower temporal quadrant of the first lens comprises a selectively disposed blue-light reflective coating within a region upon the convex surface of the lens wherein the blue-light reflective coating has a mean spectral reflectance between 430 nanometers to 470 nanometers that is greater than 30 percent and has a mean spectral reflectance between 550 nanometers to 650 nanometers that is less than 15 percent.

In some variations, the lower nasal quadrant of the second lens comprises a selectively disposed blue-light reflective coating within a region upon the convex surface of the lens wherein the blue-light reflective coating has a mean spectral reflectance between 430 nanometers to 470 nanometers that is greater than 30 percent and has a mean spectral reflectance between 550 nanometers to 650 nanometers that is less than 15 percent.

In another aspect, a method of reducing glare caused by headlights at night experienced while a person is driving a vehicle comprises: selecting an eyewear device that is configured for use on a desired roadway system; positioning the eyewear device in front of the person's eyes, wherein the person is driving the vehicle during night time hours and the person is engaging in a rotation of the head from time to time to improve quality of vision; and, whereby the engagement of head rotations are performed depending on viewing conditions such that if the person desires to reduce glare experience from headlights then the person rotates their head toward the passenger side of the vehicle, and if the person desires to improve visibility of dark objects in the roadway then the person rotates their head in the opposite direction; and the eyewear device is the device substantially described in the first aspect above and/or any of the variations thereof.

In some variations of the method, the lenses of the eyewear device comprise a lens substrate having a uniformly disposed optical filtering material that is configured such that a mean spectral transmittance between 430 nanometers to 470 nanometers of the lens substrates is less than or equal to 30 percent, and a mean spectral transmittance between 550 nanometers to 650 nanometers of the lens substrates is greater than or equal to 80 percent. In some such variations they eyewear device is configured for use on a roadway system characterized by wide roadway widths and moderate to high ambient lighting conditions. Such roadway systems are commonly encountered in urban environments and freeways.

In some variations of the method, the lenses of the eyewear device comprise a lens substrate configured such that the visible light transmittance of the lens substrates is greater than or equal to 85 percent, and the average visible light transmittance in the lower nasal quadrant of the first lens is greater than or equal to 85 percent, and the average visible light transmittance in the lower temporal quadrant of the second lens is greater than or equal to 85 percent. In some such variations, the eyewear device is configured for use on a roadway system characterized by narrow road widths and low ambient lighting conditions.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide night driving eyewear.

After reviewing the aforementioned patents of the prior art, the inventor contemplated the various strengths and weaknesses of the proposed strategies, and then engaged in an experimental process consisting of creating a series of eyewear design prototypes and then and testing the lenses while driving a car at night.

As a result of these efforts, the inventor discovered one or more novel improvements upon the prior art with preferable properties including improved spatial selectivity of glare attenuation, improved visibility of dark objects in low light conditions, improved peripheral vision, reduced need for head motions while using the glasses, improved optical quality, improved ease of manufacturing and reduced manufacturing costs. Aspects and variations of embodiments of eyewear devices designed in accordance with the invention, and embodiments of methods of using said eyewear devices, are described hereafter in detail along with the descriptions of FIGS. 1 through 12.

Figure 1:
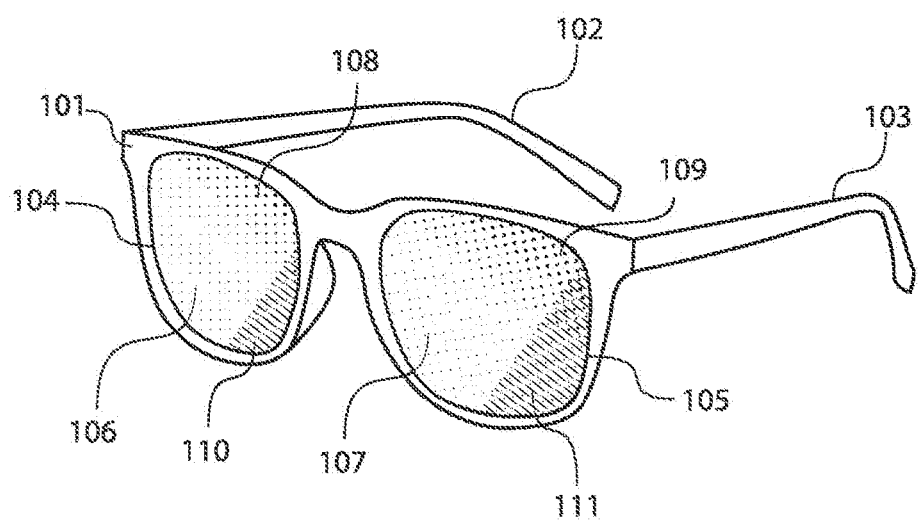
FIG. 1 is a drawing of a spectacle eyewear device designed in accordance with an embodiment of the invention.

A preferable embodiment of an eyewear device designed in accordance the invention is depicted by the drawing in FIG. 1. The eyewear device comprises a frame front 101, a left temple arm 103, a right temple arm 102, a left lens 105 and a right lens 104. Note that, in the present disclosure the "right" component within an eyewear device is defined as the component nearest to the right eye of a person wearing the eyewear, for example the "right lens" covers a person's right eye when the eyewear is positioned on the face in the normal manner.

The descriptions and drawings of eyewear herein are intended to be illustrative and not limiting. Common eyewear components such as a frame front and temple arms may be substituted with any suitable subsystem for positioning lenses or another type of light attenuating material such as a film or shield in front of a person's eyes. For example, the two distinct lenses in the drawing of FIG. 1 may be combined into a single contiguous eye shield while still providing a substantially equivalent spatially selective light attenuation functionality. However for ease of manufacturing and affordable cost of materials, use of a conventional eyewear frame with two separate lenses is preferable. For the purposes of this disclosure, the term "substantially" is defined to mean "essentially" or "approximately," wherein the terms refer to a range of numbers that one of skill in the art would consider near the stated amount by about 1%, 5%, or 10%, including increments, even if numeric values are not explicitly indicated.

Continuing with the description of FIG. 1, a dotted fill pattern within each lens represents the disposition of a light attenuating optical filtering material having a gradient distribution. In the left lens 105, the gradiently disposed optical filtering material (such as a light-absorbing dye), is disposed along a gradient axis such that a greater amount of light attenuation is provided in the upper temporal quadrant of the lens represented by the region of dots with increased size indicated at 109, and a lesser amount of light attenuation is provided in the center and lower nasal quadrant of the lens represented by the region with small dots at 107. The gradient axis is preferably oriented approximately 20 degrees away from the vertical axis of the lens and is rotated in the direction such that the region of greater light attenuation is positioned generally toward the side of oncoming traffic when the eyewear frame is positioned on the face of a driver of a car, e.g. counter-clockwise for US-standard right-hand roadway systems and clockwise for UK-standard left-hand roadway systems. Furthermore, the left lens may further comprise a blue-light reflective coating that is selectively disposed over a portion of the lens surface, represented by the lined region at 111, depicting the selective disposition of such a coating substantially including the lower temporal quadrant of the lens. In the right lens 104, a gradiently disposed optical filtering material (such as a light-absorbing dye) is disposed along a gradient axis such that a greater amount of light attenuation is provided in the upper nasal quadrant of the lens indicated by region with large dots at 108, and a lesser amount of light attenuation is provided in the center and lower temporal regions of the lens indicated by the small dots at 106. The gradient axis of the second lens is substantially parallel to the gradient axis of the right lens. Furthermore, the right lens may also comprise a blue-light reflective coating, represented by the lined region at 110, wherein the blue-light reflective coating is selectively disposed within a region of the lens that is substantially positioned in the lower temporal quadrant of the lens.

The eyewear device as depicted in FIG. 1 is configured for use on US (United States) standard roadways where cars drive on the right side of the road. An eyewear device configured in accordance with the invention for use on UK (United Kingdom) standard roadways, where cars drive on the left side of the road, would consist of a mirror image of the depicted eyewear device.

In the drawing, the dot pattern within the lenses are intended to portray a smooth variation in light attenuation (i.e., a gradiently disposed optical filtering material), and do not represent a pinhole or perforation pattern disposed across the lens surface. The preferred spectral transmittance properties of the lenses and disposition of one or more optical filtering materials within each lens is further discussed herein along with descriptions of FIG. 5, FIG. 6 and FIG. 7.

The inventor constructed a prototype eyewear device substantially as depicted by FIG. 1, and then tested the eyewear while driving a car on public roadways at night, including on multi-lane freeways, in urban city streets, and on rural two-lane roads. The inventor found that the eyewear was effective at reducing the discomfort of headlight glare from both opposing traffic and from sources appearing in the car's rear view mirrors.

In addition, the inventor observed that the eyewear embodiment as depicted required minimal use of head motions to attenuate glare from oncoming headlights, and when such motions were needed the action was intuitive and did not strain the muscles of the neck.

In addition, the eyewear did not produce any visual discomfort during use—there was no apparent "shadowing" resulting from the regions of greater light attenuation, nor undesirable reflections from the lenses, nor optical artifacts such as undesirable changes in optical power or distortion at any point within the lens.

In addition, as will be described herein, the eyewear device as depicted in FIG. 1 can be manufactured without requiring development of new non-standard methods of lens manufacturing and therefore can be expected to be an economically viable product for the consumer eyewear market.

Figure 2A:
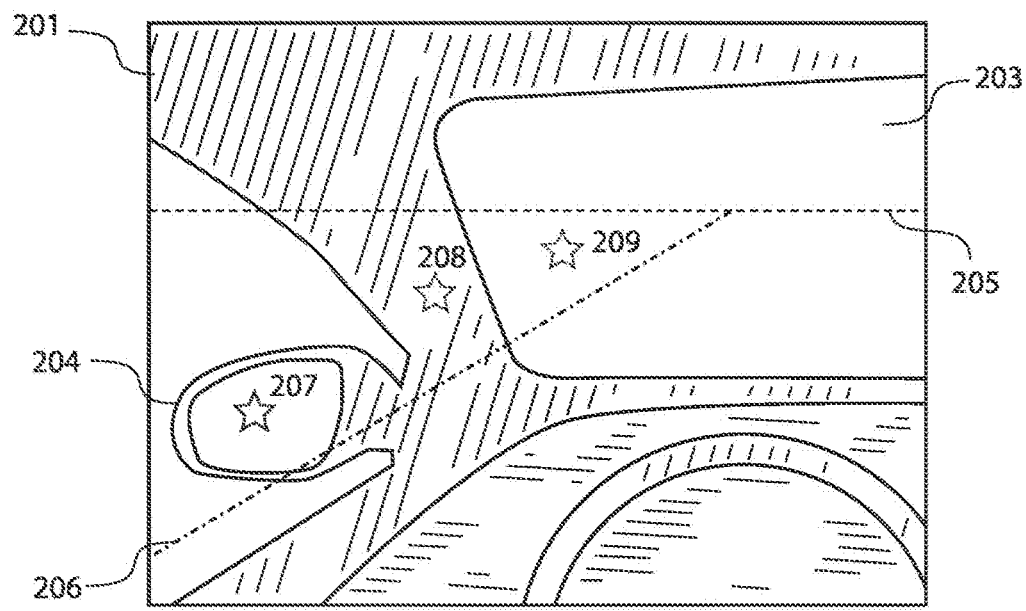
FIGS. 2A-B are drawings of an example of the field of view from the perspective of the driver of a car as seen from the driver's left eye (FIG. 2A) and the driver's right eye (FIG. 2B).
Figure 2B:
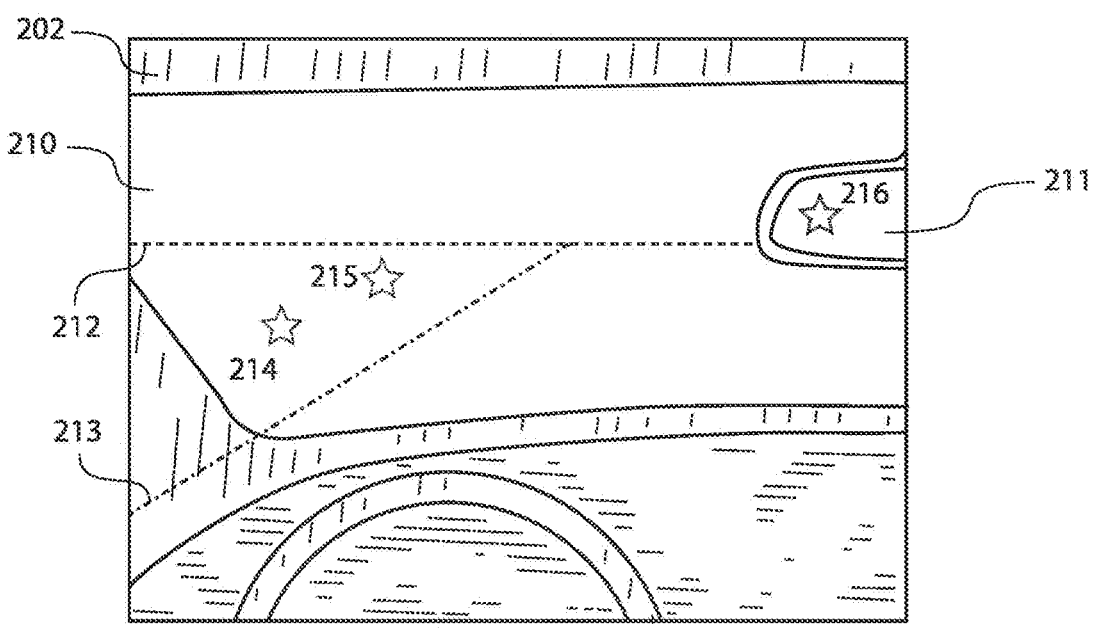

To better understand embodiments of eyewear devices designed in accordance with the invention, it is instructive to review the positions and intensity of glare sources within the field of view with respect to the left and right eyes of the driver of a car. To study this phenomenon, the inventor sat in the driver's seat of a car and took two photographs with a camera lens positioned at his left eye and right eye. FIG. 2A and FIG. 2B provide drawings constructed from these two photographs.

FIG. 2A depicts a night-time driving scene as viewed from a car driver's left eye. In US standard roadway configuration (as depicted in FIG. 2A) the left eye is nearest to the opposing lane of traffic. The scene includes the interior of the car 201, the front windshield of the car 203 and the driver's side rear view mirror 204. Within the scene, the dashed line 205 represents the horizon line, and the dot-dashed line 206 represents the roadway lane dividing line. Also within the scene, three dotted star shapes depict the location of glare sources originating from headlights of other cars. The star shape at 209 depicts the location of glare originating from a distant car traveling in the opposing lane of traffic. The star shape at 208 depicts the location of glare originating from a nearby car traveling in the opposing lane—in the drawing, the nearby car's headlight glare is obscured by the car's interior "A" pillar structure. Note that while the position and thickness of "A" pillars in a car may vary, they generally do block at least some portion of the field of view substantially as depicted in this drawing. The star shape at 207 depicts the location of a glare source originating from the headlights of car located behind the driver, which is reflected toward the driver's left eye from the driver's side outside rear-view mirror.

FIG. 2B depicts another perspective on the same night-time driving scene as in FIG. 2A, but viewed from the driver's right eye. In US standard roadway configuration, the right eye is the eye further from the opposing lane of traffic. The car interior is depicted by the shaded areas 202 and the front windshield by the non-shaded region 210. The horizon line is depicted by the dashed line at 212 and the roadway lane dividing line by the dot-dashed line 213. Within the scene, the location of three glare sources are depicted by dotted star shapes. The star at 215 represents glare originating from the headlights of a distant car traveling in the opposing lane of traffic. The star 214 represents glare originating from the headlights of a nearby car traveling in the opposing lane of traffic. The star at 216 depicts headlight glare from a car located behind the driver, which is reflected toward the driver's right eye from the center rear view mirror 211.

By analyzing the drawings of FIG. 2A and FIG. 2B, it is apparent that the left eye and right eye of a driver each have a significantly different view and experience differences in glare source position and intensity. To investigate these differences the inventor performed night driving trials and contemplated the severity of glare discomfort arriving from the various directions.

With respect to glare sources originating from rear view mirrors (e.g., FIG. 2A at 207 and FIG. 2B at 216), the driver's side outside rear mirror 204 was the location of the most significant glare sources causing eye discomfort (e.g. the source indicated at 207). Glare from the driver's outside rear-view mirror was especially problematic when driving on multi-lane boulevards or freeways where multiple lanes of traffic travel in the same direction. The centrally mounted rear view mirror (e.g. at 211) was equipped with an anti-glare mechanism (auto-dimming, and/or a switchable prism), which was found to be highly effective at glare mitigation therefore glare sources appearing in that mirror did not cause glare discomfort and do not require additional mitigation.

Furthermore, the adverse glare events originating from the driver's side mirror substantially only affect the driver's left eye. The driver's right eye has minimal vision of the driver's side outside rear-view mirror.

The passenger side mirror (not shown in FIG. 2B, but located substantially to the right peripheral field of view), is also an occasional location of glare sources affecting the right eye, but with significantly less frequency and less intensity.

With respect to glare sources originating from headlights of nearby cars driving in the opposite direction (for example FIG. 2A at 208 and FIG. 2B at 214), the inventor noted that the intensity of glare discomfort for both eyes is approximately equal, however in some circumstances the left eye experienced a momentary relief from the most intense experience of glare when the opposing headlights were occluded by the car's "A" pillar, meanwhile the right eye experienced no relief from such occlusion.

With respect to glare sources originating from headlights of more distant cars in the opposing lane (for example FIG. 2A at 209 and FIG. 2B at 215), the inventor observed that both the right and left eyes experienced essentially the same degree of glare discomfort. However, the overall glare intensity from distant cars was lesser than from the other sources mentioned above, due to the greater distance of the headlights.

Figure 3:
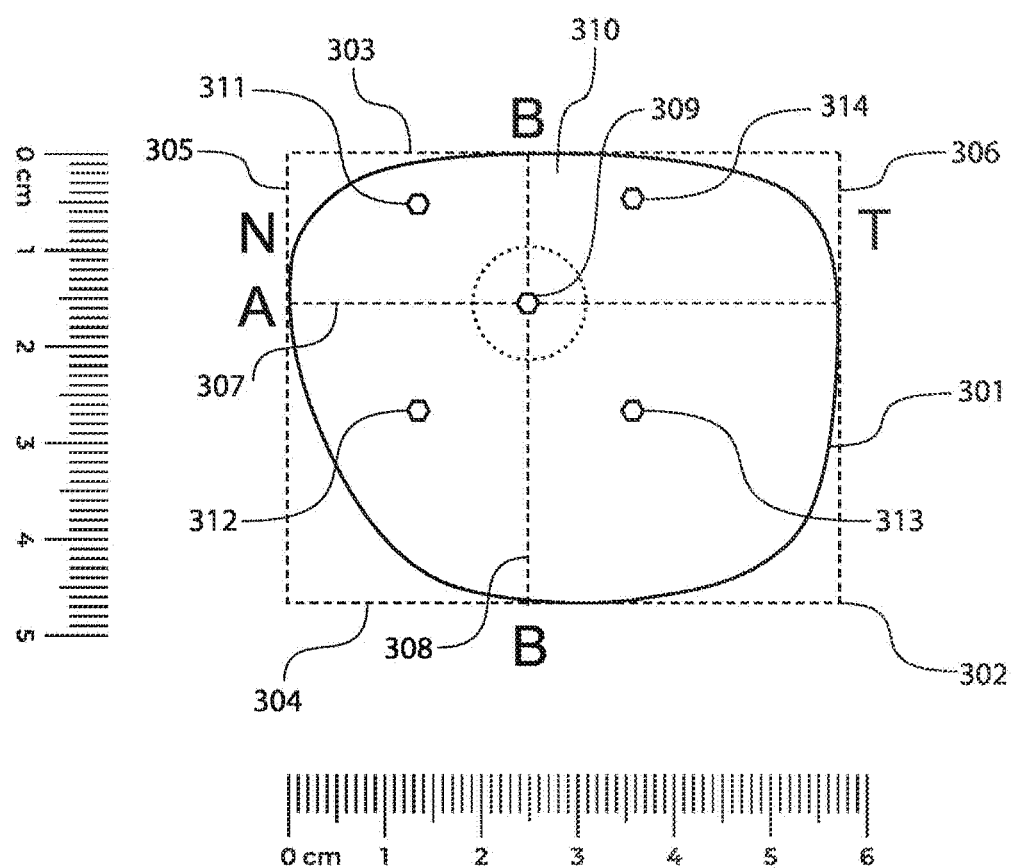
FIG. 3 is a diagram of a spectacle eyewear lens identifying reference points and axes for measurement of lens properties.
Figure 4:
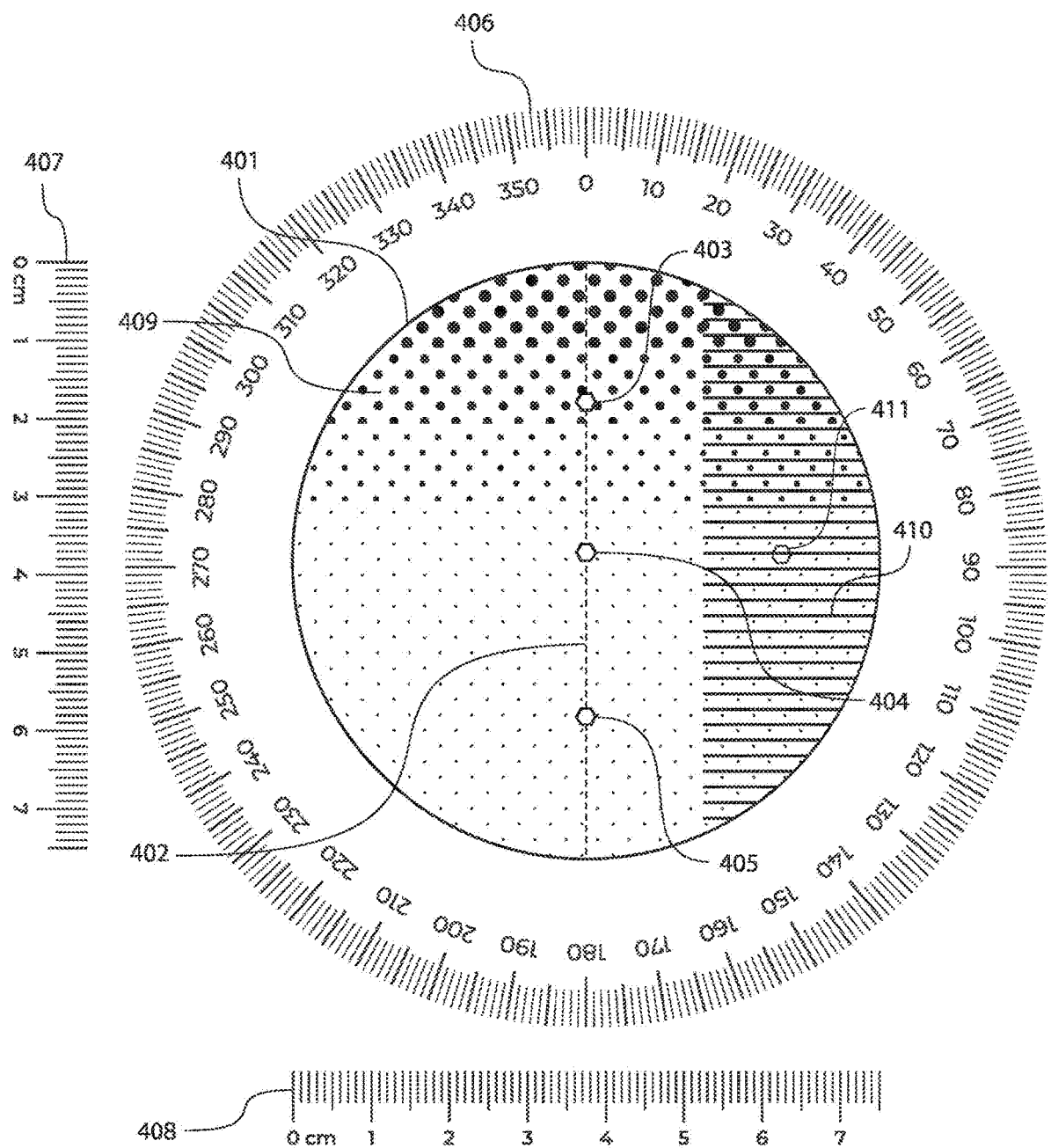
FIG. 4 is a diagram of a lens blank comprising a gradiently disposed optical filtering material distributed along a gradient axis, and a selectively disposed blue-light reflective coating distributed within a circular segment bounded by a chord that is substantially parallel to the gradient axis.

To enable an adequate technical description of eyewear in accordance with embodiments of the invention, it is helpful to define certain terminology related to eyewear lenses, so that the reader may better understand the technical limitations described in this disclosure. FIG. 3 and FIG. 4 are presented herein to assist in the detailed description of the terminology used in this disclosure.

FIG. 3 is a diagram of an eyewear lens annotated with a lines and reference points defining key dimensions, points and regions within the lens. The outermost edge of the eyewear lens is represented by the solid contour at 301. The lens shape shown is representative and is a common shape that is found in eyewear frames, however other lens shapes are possible and the shape shown is intended to be a representative sample and is not intended to limit the invention. The lens shape is enclosed by a bounding box indicated by the dashed rectangle at 302. Opticians skilled in the art of fabricating lenses use the bounding box of an eyewear lens as a system for performing calculations required to correctly manufacture finished eyewear lenses. The bounding box has four sides: the top side 303, the bottom side 304, the nasal side 305 (herein "nasal" refers to the side nearest to the person's nose when the lens is mounted and worn in a completed eyewear device with frame and lenses), and the temporal side 306 (herein "temporal" refers to the side of a lens nearest to the person's temple (i.e., the side of the head) when the lens is mounted and worn in a completed eyewear device with frame and lenses). Opticians characterize the horizontal width of a lens according to the width of its bounding box, which is also called the "A" dimension of a finished eyewear lens, and is represented in FIG. 3 by the dashed line at 307. Opticians further characterize the vertical height of a lens according to the height of its bounding box, which is called the "B" dimension and represented in FIG. 3 by the dashed line at 308.

Within an eyewear lens, the optical center of the lens corresponds to a point approximately located at the point indicated by the hexagonal indicator at 309. The optical center is defined as the point on the lens where the person wearing the completed eyewear device will look through when gaze is directed straight forward. Most commonly, the optical center is located between 10 millimeters to 20 millimeters from the top edge of the lens, and between 15 millimeters to 20 millimeters from the nasal side of the lens. Note that the optical center usually substantially biased toward the upper nasal corner of the lens.

The dotted circle at 310 indicates a region within which the optical center of the lens will generally occur for any person using the eyewear, taking into account variations in the fitting height of the eyewear frame (i.e., the vertical position on the person's nose) and the variations in inter-pupil distance which varies between 60 millimeters to 75 millimeters across the adult population. For the purpose of characterizing the spectral transmittance and the visible light transmittance of a lens in accordance with the ANSI Z80.3-2020 standard the spectroscopic measurements are performed within the indicated central region around the optical center unless otherwise specified.

Continuing with the description of FIG. 3, four representative points within regions outside of the optical center are indicated: a point in the upper nasal quadrant 311, a point in the upper temporal quadrant 314, a point in the lower nasal quadrant 312, and a point in the lower temporal quadrant 313. These quadrants partition the lens into four contiguous regions. To characterize a lens with a spatially non-uniform spectral transmittance, the spectral transmittance within a quadrant or region may be characterized by performing a spectroscopic measurement at a representative point as shown, or may be characterized by performing multiple spectroscopic measurements within the region and then averaging the measurements. For example, multiple spectroscopic measurements may be taken on a 10 millimeter grid within the region, and then the transmission spectra averaged together for further analysis. Any optical property of a lens may be averaged over a region using the this method, including the mean spectral transmittance and the visible light transmittance.

A common means of providing a lens with a non-uniform disposition of optical filtering material is by gradiently tinting a lens, wherein a light absorbing dye is gradiently disposed along a gradient axis. Most commonly, a relatively greater amount of light attenuation is provided in the upper half of the lens (i.e., in the upper nasal and upper temporal quadrants), and a lesser amount of attenuation is provided in the lower half of the lens (i.e., in the lower nasal and lower temporal quadrants), and the gradient axis is vertically oriented. In sunglasses, a gradient tint may be preferable for its fashionable appearance, and for providing a greater attenuation of light originating from above the wearer, specifically the sun and the sky, which tend to be brighter than the ground in typical outdoor daylight situations.

FIG. 4 depicts a gradient tinted lens blank comprising a gradiently disposed light absorbing dye wherein the gradient axis is oriented vertically such that the portion of the lens with greater attenuation is at the top of the lens blank. A lens blank, also called an "uncut lens", is a form of raw lens material that is capable of being machined into a variety of possible shapes for mounting into eyewear frames. The most common shape of a lens blank is round. The solid circle at 401 indicates the outer edge of a lens blank.

Gradient tinted lenses are most commonly manufactured by immersing a lens into a heated bath of liquid within which one or more dyes is dispersed or dissolved, and then moving the lens up and down in an oscillating motion, and thereby causing the dye to diffuse from the heated bath into the surface of the lens, whereby the surface of the lens that is exposed to the dye bath for a longer aggregate duration of time absorbs, by diffusion, a greater amount of the dye and therefore exhibits a relatively greater amount of light attenuation.

Gradient tints can also be manufactured using reflective coatings in a vacuum deposition chamber equipped with a masking apparatus to enable a gradient in the thickness of the deposited reflective coating, thereby resulting in a greater amount of light attenuation over the portion of the lens where the reflective coating is thickest.

Gradient tinted lenses provide a spatially non-uniform spectral transmittance that varies between light to dark along a gradient axis, while also having a substantially uniform spectral transmittance along any line perpendicular to the gradient axis. In FIG. 4, the dot pattern 409 within the lens represents the variation of light absorbing dye caused by an example gradient tint, wherein the larger dots in the top portion of the lens represent a relatively greater amount of light attenuation while the smaller dots in the bottom portion of the lens represent a relatively lesser amount of light attenuation.

The gradient axis of the gradient tint is indicated by the dashed line at 402. Along this line, three representative points are indicated: a point in the upper portion of the lens at 403, a point in the geometric center of the lens at 404 and a point in the lower portion of the lens at 405. In the example lens depicted by FIG. 4, the gradient tint is limited to the upper portion of the lens.

The example lens blank of FIG. 4 may also comprise a selectively disposed blue-light reflective coating, indicated by the lined region at 410. Herein, an additional representative points of interest is indicated by the hexagon shape at 411. The selectively disposed blue-light reflective coating is not required to practice the invention, but may be preferable in some embodiments as will be explained in further detail herein. A selectively disposed reflective coating may be disposed upon the surface of a lens by masking a portion of the lens in such a way that a dielectric reflective coating may be deposited upon the surface of the unmasked portion of the lens.

A common size for a lens blank is 75 millimeters in diameter, as depicted in FIG. 4. Lens blanks generally are most commonly manufactured with a diameter between 60 millimeters to 80 millimeters. The size of the lens blank depicted may be compared to the horizontal millimeter scale at 408 and vertical millimeter scale 407. To enable discussion of lens orientation, a clockwise rotation scale is shown at 406, with zero degrees at the 12-o-clock position.

For the purposes of practicing the invention of this disclosure, the inventor has found that a lens blank diameter of at least 73 millimeters is preferable, and a gradient specification of a 4:6 ratio (meaning, the mid-point of the gradient is approximately 40% of the lens diameter, or around 30 millimeters from the top edge), is preferable, to ensure the resulting lens blank has sufficient diameter to enable lenses up to 60 millimeters in width to be machined from the lens blank.

Figure 5:
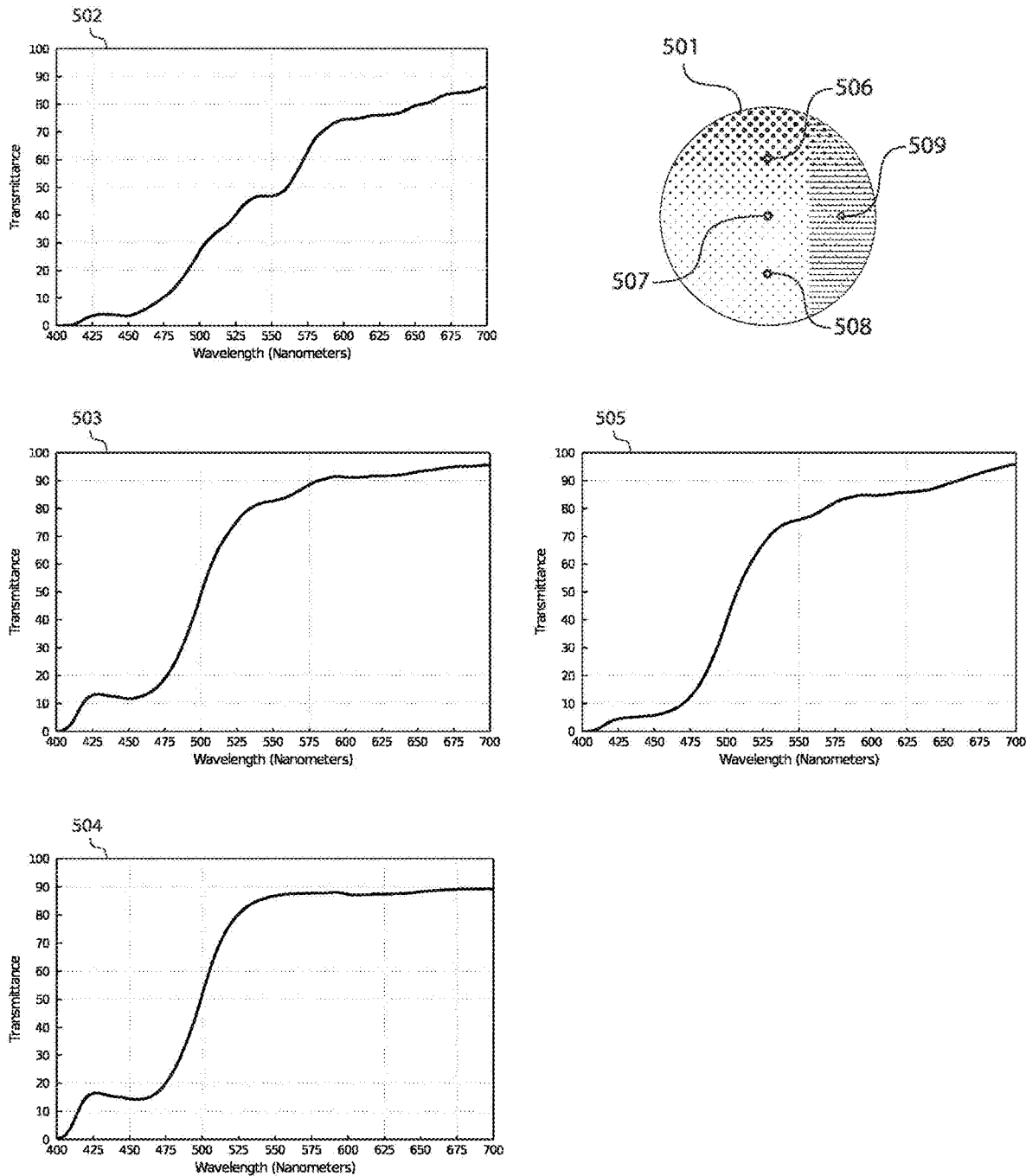
FIG. 5 is a diagram of a lens blank manufactured in accordance with an embodiment of the invention wherein the non-uniformity of the spectral transmittance of the lens is demonstrated at four points with graphs corresponding to the spectral transmittance at each of the four points.

FIG. 5 depicts the spectral transmittance properties of a gradient tinted lens blank manufactured in accordance with an embodiment of the invention comprising a uniformly disposed yellow dye incorporated into the lens substrate, and a gradiently disposed orange dye, and a selectively disposed blue-light coating. The lens blank is depicted by the round contour at 501, and graph of the spectral transmittance of the lens are shown with corresponding location of the spectroscopic measurement within the lens blank: the graph at 502 is a graph of the spectral transmittance as measured at the point indicated at 506 located in the top portion of the lens, whereat a relatively greater amount of light attenuation is provided by the gradiently disposed orange dye; the graph at 503 is a graph of the spectral transmittance as measured at the geometric center of the lens blank indicated by the point 507 whereat the spectral transmittance exhibits a relatively lesser amount of light attenuation comprising a combination of a small amount of the gradiently disposed orange dye with a substantial portion of the spectral filtering performed by the uniformly disposed yellow dye within the lens substrate; the graph at 504 is the spectral transmittance as measured at a point in the bottom portion of the lens as measured at the point indicated at 508, whereat the lens has the greatest amount of visible light attenuation and the spectral transmittance is characteristic of zero contribution from the gradiently disposed orange dye in combination with the uniformly disposed yellow dye; and; and, the graph at 505 is the spectral transmittance as measured at a point parallel to the optical center but located within a selectively disposed blue-light reflective coating indicated at 509, whereat the amount of visible light transmittance is substantially the same compared to that at the geometric center however with the additional attenuation of blue-light wavelengths caused by the contribution of the blue-light reflective coating.

The effect of a wavelength-selective spectral transmittance upon human color vision can be understood by examination of the mean spectral transmittance within three broad sub-bands of the visible spectrum: the blue-light sub-band corresponding to light having a wavelength between 400 nanometers to 500 nanometers or alternatively the more specific sub-band between 430 nanometers to 470 nanometers, the green-light sub-band corresponding to light having a wavelength between 501 nanometers to 560 nanometers, and the red-light sub-band corresponding to light having a wavelength between 600 nanometers to 650 nanometers. The mean spectral transmittance within a sub-band of the visible spectrum is the average spectral transmittance between the upper and lower wavelengths defining a sub-band. The mean transmittance can be calculated by sampling the transmittance spectrum using a suitable interval (for example, every 1 nanometer or every 5 nanometers or every 10 nanometers), then summing the samples and then dividing by the total number of samples.

As shown in FIG. 5, in the top portion of the lens, as indicated by the graph 502 and corresponding point 506 within the upper portion of the lens blank, the lens strongly attenuates blue light and also moderately attenuates green light and also weakly attenuates red light. An absorptive optical filter with the spectral transmittance curve as shown at 502 is generally referred to as having an orange color. In the center portion of the lens blank, as indicated by the graph 503 and corresponding point 507, the lens strongly attenuates blue light and weakly attenuates green light and is has nearly zero attenuation of red light. In the center right-side region of the lens blank, as indicated by the graph 505 and corresponding point 509, the lens strongly attenuates blue light and weakly attenuates green light and is has nearly zero attenuation of red light. An absorptive optical filter with this spectral transmittance is generally referred to as having a yellow color. In the lower portion of the lens at the graph 504 and corresponding point 508, the lens moderately attenuates blue light and very minimally attenuates green light and has nearly zero attenuation of red light. An absorptive optical with this spectral transmittance is generally described as having a pale yellow color. In summary, by considering the collection of spectral transmittance graphs, the example lens can be described as having an appearance that varies from yellow to orange across the surface of the lens.

Figure 6:
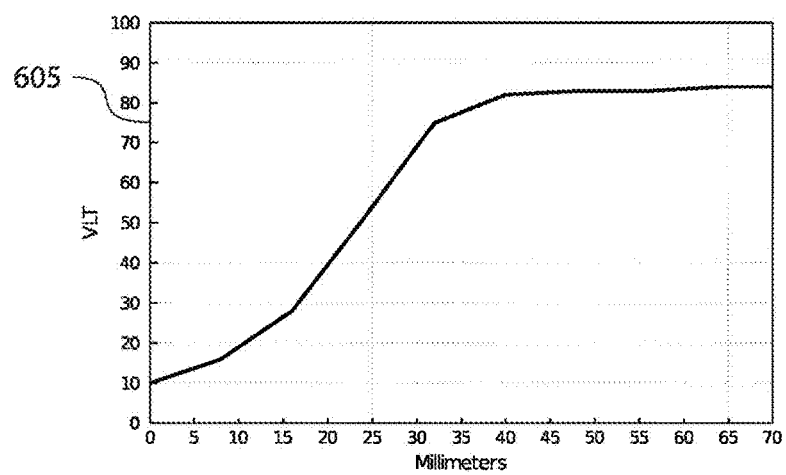
FIG. 6 is a diagram of a lens blank manufactured in accordance with an embodiment of the invention, wherein the lens blank has a spatially varying spectral transmittance and measurements of the visible light transmittance of the lens are graphed along three line segments that are parallel to, perpendicular to, and at 45 degrees away from a gradient axis.
Figure 6:
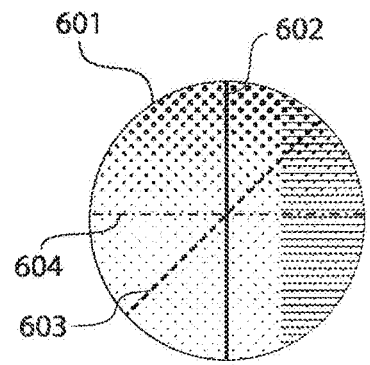
Figure 6:
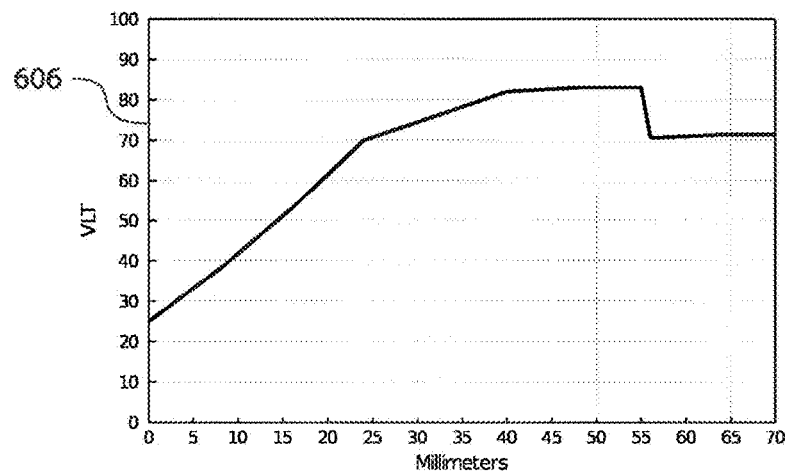
Figure 6:
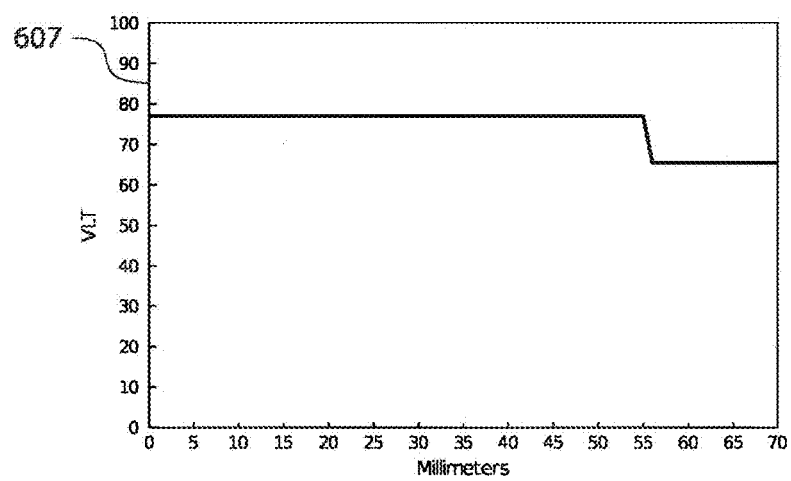

Continuing with the description of spatially non-uniformly disposed optical filtering materials incorporated within an example lens blank manufactured in accordance with an embodiment of the invention, FIG. 6 provides a series of graphs corresponding to measurements of the visible light transmittance as measured across diameters of such an example lens blank. In FIG. 6, the round shape at 601 corresponds to the lens blank as previously described in FIG. 4 and FIG. 5, and lines 602, 603 and 604 correspond to lines along which the VLT is measured and plotted in corresponding graphs: the graph at 605 depicts the VLT as measured along the solid line 602 proceeding from the top of the lens blank to the bottom of the lens blank. Herein, it is apparent that the VLT changes from below 20 percent to over 70 percent over a span of 20 millimeters between the 10 mm and 30 mm positions. This region is where the rate of change of the orange-colored light absorbing dye is at its maximum rate of change, and the maximum rate of change (i.e., the upper bound on the rate of change) is approximately 250 basis points per millimeter. It may also be noted that the VLT is greater than 75 percent across the entire lower portion of the lens (e.g. from 35 mm to 70 mm). The graph at 606 shows the VLT as measured along the corresponding dashed line within the lens blank 603, wherein the dashed line is oriented 45 degrees away from the vertical axis of the lens blank. In the graph at 606 it can be observed that the VLT proceeds from around 30 percent to over 80 percent across a 35 millimeter distance, which is equivalent to a rate of change of 140 basis points per millimeter. The graph at 607 and corresponding dot-dashed line within the lens blank at 604 shows the VLT measured along a line perpendicular to the gradient axis, and passing through the geometric center of the lens blank. Along this line the VLT is uniform, but undergoes a step transition at approximately 55 millimeters corresponding to the boundary of the selectively disposed blue-light reflective coating applied to the right side of the lens blank.

For the purpose of manufacturing an eyewear embodiment in accordance with the invention having a spatially non-uniform spectral transmittance, it is preferable for the lenses to have smooth variation in light attenuation between regions of greater and lesser light attenuation, as to avoid a visually annoying "line" artifact, unless such a step transition is limited in magnitude such as being less than 1000 basis points. However, it is also preferable for practicing the invention that the lenses have a substantial contrast between the light and dark regions of the lens, which requires the smooth transition to have a high rate of change in VLT compared to a conventional gradient tinted lens found in consumer sunglasses. A gradient tint with this property may be called a "fast gradient" wherein a gradient that is "fast" has a maximum rate of change in VLT between at least 100 basis points per millimeter and may be up to 400 basis points per millimeter. The use of a fast transition enables the wearer to easily rotate their head to cause a glare source to be viewed through a region of the lens with significantly greater light attenuation, while minimizing the angular distance of head rotation required. In some variations, it may be preferable to have a second region substantially to one side of the gradiently disposed material, wherein a blue-light reflective coating may be selectively disposed. Preferably the reflective coating reflects substantially only blue light wavelengths, which enables the coating to have a low overall reflectance and therefore limits the magnitude of any change in VLT across the boundary where the coating is applied, and furthermore provides an overall low visibility of the reflected portion of light whereas coatings with a moderate to high reflectance may cause undesirable internal reflections visible to the user of the eyewear. Furthermore, in some variations of the invention, it is preferable for the lens substrate to comprise a uniformly disposed optical filtering material that is configured so that the visible light transmission of the lens substrate is between 75 percent to 85 percent throughout any region of the lens not affected by the gradiently disposed optical filtering material and/or the selectively disposed blue-light reflective coating.

Figure 7A:
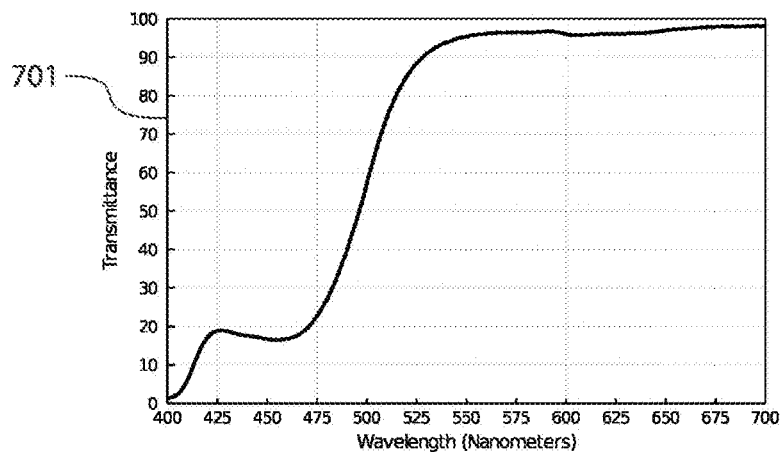
FIGS. 7A-C are graphs of the spectral transmittance of a blue-absorbing (yellow-colored) dye, of a broad-band blue- and green-absorbing (orange-colored) dye, and of a blue-light reflective coating.
Figure 7B:
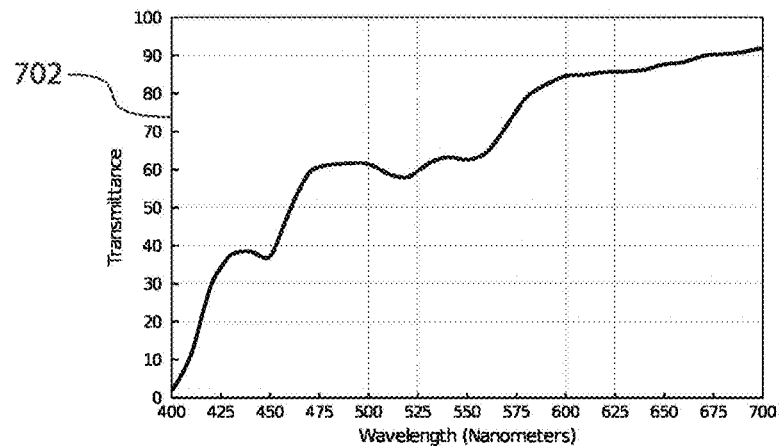
Figure 7C:
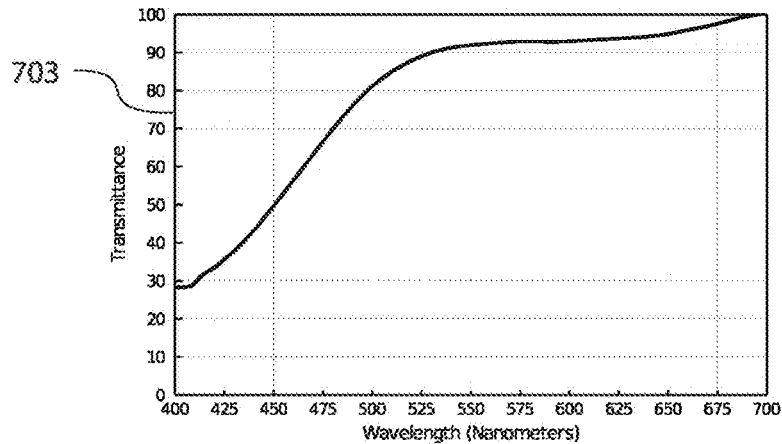
Figure 8:
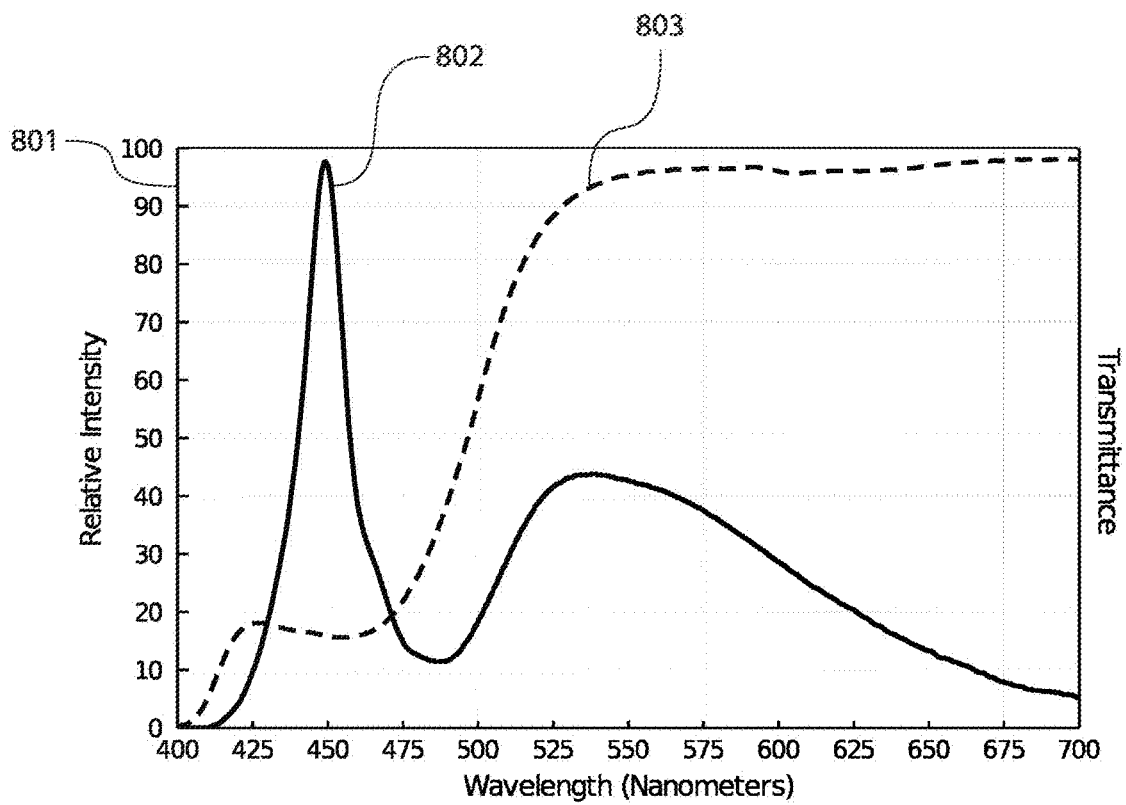
FIG. 8 is a graph of the normalized spectral intensity of a blue-pumped phosphor converted "cool white" white light emitting diode (LED), a type of light emitter commonly used in contemporary vehicle headlights and roadway illumination lamps, and the spectral transmittance of a wavelength-selective blue-absorbing dye.

FIG. 7 includes three graphs of the spectral transmittance of two dye components and of a blue-light reflective coating that may be combined to provide a lens having the described properties of spatially non-uniform spectral transmittance as discussed along with FIG. 5 and FIG. 6. In some variations, the lens may be manufactured using a two step process: First, a lens substrate with a uniform tint is manufactured using a blue-light absorbing (i.e., yellow-colored) dye resulting in a lens substrate that strongly attenuates blue-light and weakly attenuates green light, having the spectral transmittance substantially as shown in FIG. 7 at 701. In the second step of manufacturing, an orange dye (i.e., a blue and green absorbing dye) is added to the lens using a gradient tint process by immersing the lens in a heated bath comprising the orange dye dispersed and/or dissolved into a fluid and then brought into contact with the lens using an oscillating linear actuator system, resulting in a gradient disposition of the orange dye across the surface of the lens. The spectral transmission a suitable orange dye, measured in isolation without the contribution of the yellow dye, is shown in the graph of FIG. 7 at 702.

Furthermore, in some variations an optional third step may be employed wherein a blue-light reflective coating may be applied to some or all of the lens blank, to further increase the blue-light attenuation of the lens within a region, or across the entire lens. Preferably the blue-light reflective coating should have a relatively greater mean spectral reflectance between 430 nanometers to 470 nanometers, for example 30 percent or greater, and a lower mean spectral reflectance between 550 nanometers to 650 nanometers, for example less than or equal to 15 percent.

The inventor has found the method of manufacturing a lens blank as described herein to be preferable for manufacturing of lens blanks in accordance with the invention. More specifically, the uniformly distributed dye may be incorporated directly into a bulk polymer material and then cast into a lens blank shape, and then the gradient tinted dye may be added using a standard dye diffusion tinting process. Alternatively, the first uniformly distributed dye can also be manufactured using a tinting process, but may have the disadvantage of causing the first uniform dye to leech out during the second gradient tinting step. Alternatively, in some variations the lens substrate need not incorporate any significant amount of visible light attenuating material while the gradiently disposed light attenuating material is sufficient alone to produce a lens blank that may be useful for practicing the invention.

A common complaint today regarding headlights concerns the growing prevalence of light-emitting diode (LED)-based white headlights. These headlights may contribute more to the sensation of glare due to the high intensity blue "peak" that is characteristic of a blue-diode pumped phosphor-converted white LED emitter. The graph in FIG. 8 at 801 depicts simultaneously an example of the relative radiometric intensity of a "cool white" LED at 802, and the spectral transmittance of a blue-light attenuating dye at 803, wherein it can be observed that there is a significant peak of spectral energy emitted by the LED centered at 450 nanometers, and the blue-light attenuating dye is configured in such a way that it may reduce the mean spectral transmission between 430 nanometers to 470 nanometers to less than 20 percent. In some variations, it is preferable that the blue-light attenuating dye also transmits non-blue light to a high degree, for example by having a mean spectral transmittance between 550 nanometers to 650 nanometers that is greater than or equal to 80 percent. In some variations of the invention, the lens substrate preferably comprises such a dye that is uniformly disposed throughout the substrate, so that a substantial amount of blue-light attenuation is provided across the entire lens.

Figure 9:
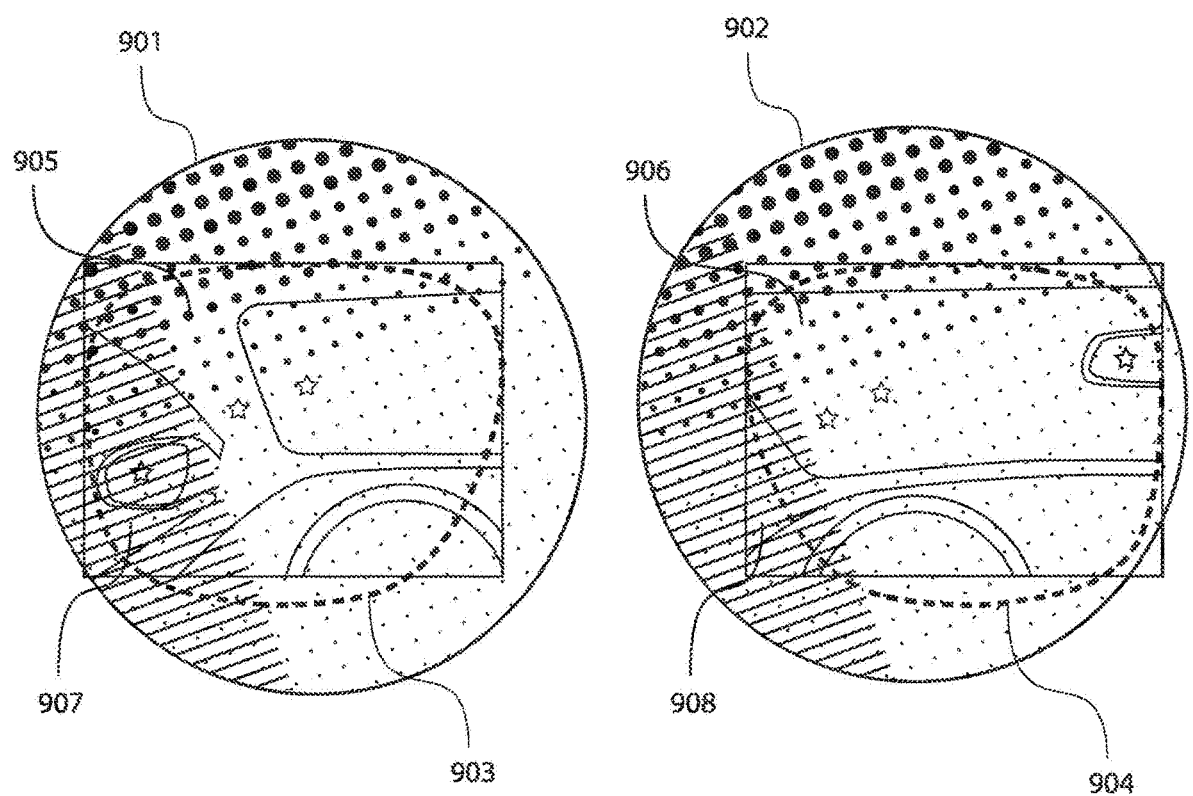
FIG. 9 is a drawing of the field of view of the driver of a car, as seen from the left and right eye, each overlaid with an example lens blank.

FIG. 9 is a drawing depicting a pair of gradient tinted lens blanks (each also optionally including a selectively disposed blue-light attenuating coating within a region), wherein each of the lens blanks oriented and then superimposed over the example visual scene as seen from each eye of the driver of a car; the scene was described in detail along with FIG. 2. The manufacturing step of orienting and positioning a lens blank prior to machining a desired eyewear lens shape is called "blocking" by opticians. For the purpose of discussion herein the rotation scale shown in FIG. 4 at 406 defines a coordinate system for rotations of a gradient tinted lens. In FIG. 9, the left lens indicated at 901 is rotated counter-clockwise approximately 20 degrees from vertical so that when the desired lens shape is machined from the lens blank (as indicated by the dashed contour at 903), the region of greatest light attenuation (indicated at 905) will be located in the upper temporal quadrant of the finished eyewear lens. Additionally, the right lens at 902 is also rotated approximately 20 degrees counter-clockwise away from the vertical axis so that when the desired lens shape 904 is machined from the lens blank the region of greatest light attenuation 906 will be located in the upper nasal quadrant of the finished eyewear lens. Optionally, the lenses may also comprise a selectively disposed blue-light attenuating coating that is configured such that the region of the lens where the coating is applied is located substantially in the lower temporal quadrant of the left lens (e.g., as shown at 907), and, optionally, to the lower nasal quadrant of the right lens (e.g., as shown at 908). In some variations only one of the lenses has the selectively disposed blue-light attenuating coating, which is the lens nearest to the driver's outside mirror. When the lens blanks are blocked as shown, the region of greatest light attenuation may be optimally positioned to attenuate glare within regions of the field of view of the left and right eyes where glare sources are most likely to occur with the greatest intensity, as described in the annotated scenes in FIG. 2A and FIG. 2B.

The method of rotating and blocking lenses as discussed with FIG. 9 is preferable for manufacturing an embodiment of an eyewear device in accordance with the invention for use on US-standard right-hand-drive (RHD) roadways. For use on left-hand-drive (UK-standard) roadways, the direction of lens rotations is changed from counter-clockwise to clockwise, resulting in a mirror image of the blocking configuration.

To better understand the most preferable rotation angle for the orientation of the gradient axis of each lens, the inventor manufactured prototype eyewear having pairs of lenses with no rotation (i.e., the gradient axis coincident with the vertical axis of each lens), and eyewear wherein the lenses each had rotations of 10 degrees, 20 degrees, 30 degrees and 45 degrees counter-clockwise away from the vertical axis. The inventor then tested this collection of prototype eyewear while driving at night. The following observations were noted by the inventor: with no rotation of the gradient axis, the lens provided an overall darkening of the view of the forward roadway that was undesirable, requiring the user to hold their head at an upward angle to maintain good visibility. Furthermore, whereas the optical center of eyewear is biased toward the top edge of the frame, the region within which the gradiently disposed material could be applied was too small for practical use. Next, when testing the prototype with 10 degrees rotation the inventor noted that the slight rotation of the gradient axes improved the eyewear performance by increasing the perceived brightness of the lens, improving the visibility of the forward portion of the roadway, and improving the peripheral visibility toward the right-hand side of the road (i.e., outside edge of the road). Further, when testing the prototype with a 20 degrees rotation the inventor noted that the sensation of increased brightness further improved, and that the total area of the lens wherein the gradiently disposed optical filtering material was applied was effectively increased. A similar result was obtained from the prototype with a 30 degrees rotation. However, in the prototype with a 45 degrees rotation the inventor observed that the gradiently disposed optical filtering material was positioned in such a way that it attenuated light originating from the driver's side view mirror, which contributed to a sense of reduce peripheral vision that was undesirable. Indeed, referring to FIG. 3, and examining the upper nasal and temporal quadrants of the example lens shape, it may be appreciated that these quadrants are both rectangular in shape and have a diagonal that is approximately between 20 degrees to 30 degrees inclination. Therefore it may be expected that a rotation of the gradient axis by such an angle may result in an optimal filling of these quadrants with the gradiently disposed optical filtering material whereby the greatest amount of lens surface area may be configured to provide the desired light attenuation, without allowing the gradiently disposed optical filtering material to significantly extend below the optical central line and horizon line of the field of view of a wearer of the spectacle eyewear (i.e., the line indicated 307 in FIG. 3). In conclusion the most preferable embodiment of an eyewear device manufactured in accordance with the invention comprises each lens having a gradiently disposed optical filtering material that is oriented approximately 20 degrees away from the vertical axis of each lens, with a range of between about 10 degrees to about 30 degrees substantially bounding the useful range of gradient axis orientations.

Figure 10:
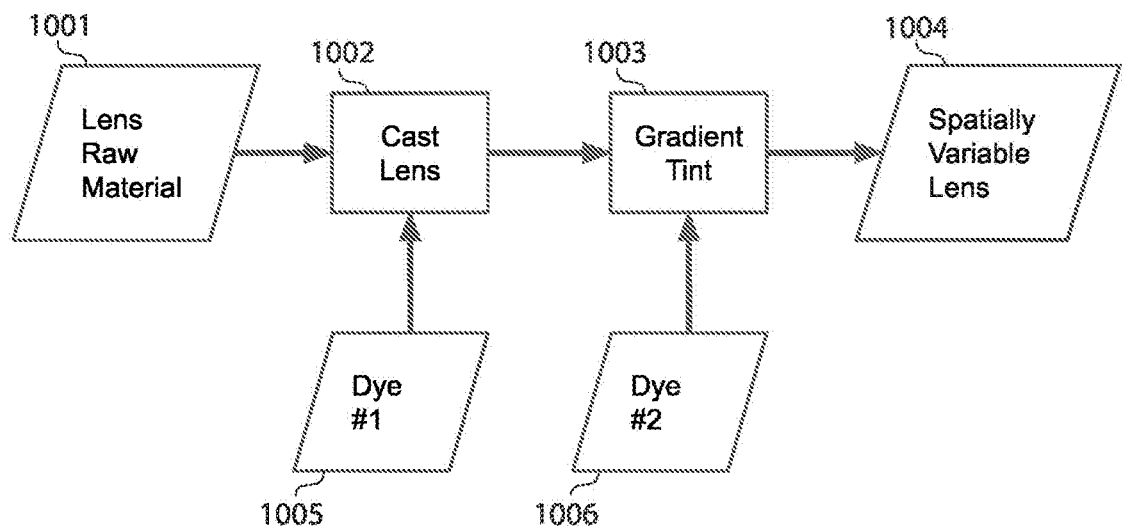
FIG. 10 is a flow chart depicting an embodiment of a process of manufacturing a lens with a non-uniform spectral transmittance.

FIG. 10 is a process flow chart depicting an embodiment of a process of manufacturing a lens blank having a spatially non-uniform spectral transmittance in accordance with some embodiments of the invention. In the process, a lens raw material 1001 is provided, which is optionally combined with a first dye 1005 which is intermixed with the lens raw material, and then formed into a lens blank in a casting process 1002. Examples of lens raw materials include pelletized thermoplastics such as polycarbonate, nylon or copolyesters which are injected under heat and pressure into a metal mold. Further example of lens raw materials include liquid monomers and liquid two-part polymer systems that are reacted by an initiator, by UV light, or thermal and/or chemical reactions to form a rigid lens cast in a glass mold. In one embodiment, the first dye 1005 is a yellow dye such as KeyPlast® Yellow 3G manufactured by Milliken & Company. In another embodiment, the first dye 1005 is a wavelength-selective yellow dye, such as Epolight® 5843 manufactured by Epolin, LLC. After forming a lens incorporating the first dye at 1002, the lens is subjected to a gradient tinting process in the next step 1003, wherein the formed lens is immersed in a heated liquid comprising a second dye 1006. In one embodiment, the second dye is a blue- and green-absorbing dye, i.e., an orange dye, such as the disperse dye C200-45 Opti-Safe® Orange Lens Dye manufactured by Phantom Research Laboratories, Inc. Optionally, a selectively disposed optical filtering material may also be combined with the lens, whereby a masked deposition of a blue-reflecting "revo" or "reflex" coating causes the reflective coating to be substantially positioned over a region of the lens. The result of the casting followed by gradient tinting is a lens having combined properties of a spatially non-uniform spectrally selective transmission 1004. The lens examples discussed in FIG. 5 and FIG. 6 may be manufactured by the method described in FIG. 10.

Figure 11:
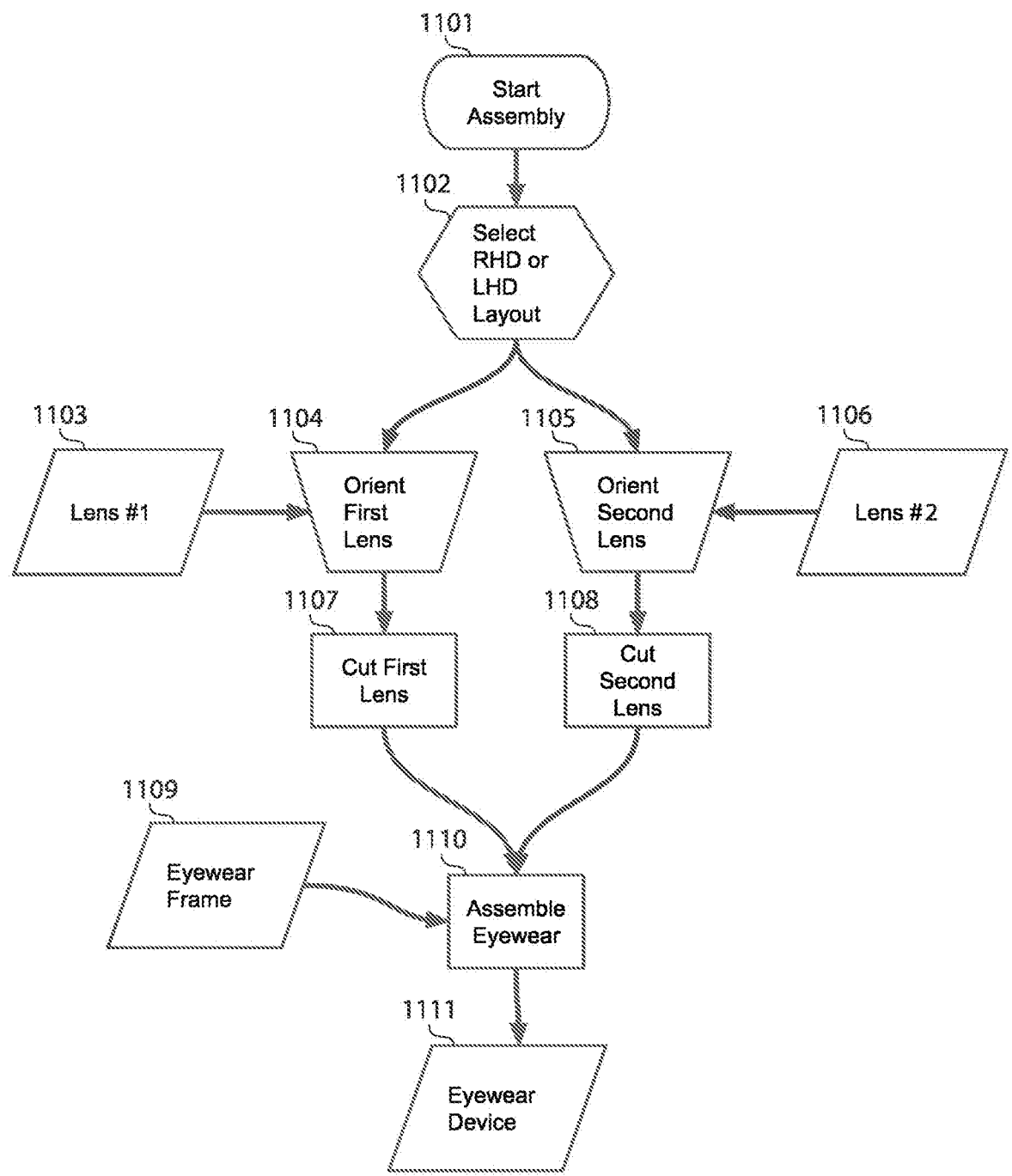
FIG. 11 is a flow chart depicting an embodiment of a process of manufacturing an embodiment of an eyewear device.

FIG. 11 is a process flow chart depicting an embodiment of a process of manufacturing an eyewear device in accordance with some embodiments of the invention. The process begins at 1101 and proceeds to an initial decision point at 1102 wherein the appropriate target environment for use of the eyewear is determined by selecting between either a right-hand drive roadway system (RHD), which is consistent with the USA roadway standards, or a left-hand drive roadway system (LHD), which is consistent with UK roadway standards and a handful of other countries. The choice of RHD or LHD use dictates the correct orientation and positioning of the lenses within the eyewear device. In the next section of the flowchart, two sub-processes may be performed sequentially or in parallel, the sub-processes comprising providing a first lens blank 1103, orienting the first lens blank 1104, and then cutting (edging) the lens blank 1107 into the correct shape for mounting in an eyewear frame; in parallel (or optionally sequentially), a second lens blank is provided 1106 which is also oriented 1105 and cut (edged) into the correct shape 1108. The pair of resulting eyewear lenses is then combined with an eyewear frame in an assembly process at 1110 wherein the two lenses are mounted into an eyewear frame 1109, resulting in a completed eyewear device 1111. In one embodiment, the first lens 1103 comprises a spatially non-uniform spectral transmittance and is oriented and/or positioned 1104 so that the region of greatest light attenuation is positioned within upper temporal quadrant of the lens nearest to the driver's outside rear view mirror, with respect to the driver and mirror position within a vehicle configured for the desired roadway system. Further, the second lens 1106 also comprises a spatially non-uniform spectral transmittance and is oriented and/or positioned 1105 so that the region of greatest light attenuation is positioned within the upper nasal quadrant of the lens nearest to the driver's inside (center) rear view mirror, with respect to the driver and mirror position within a vehicle configured for the desired roadway system.

Figure 12:
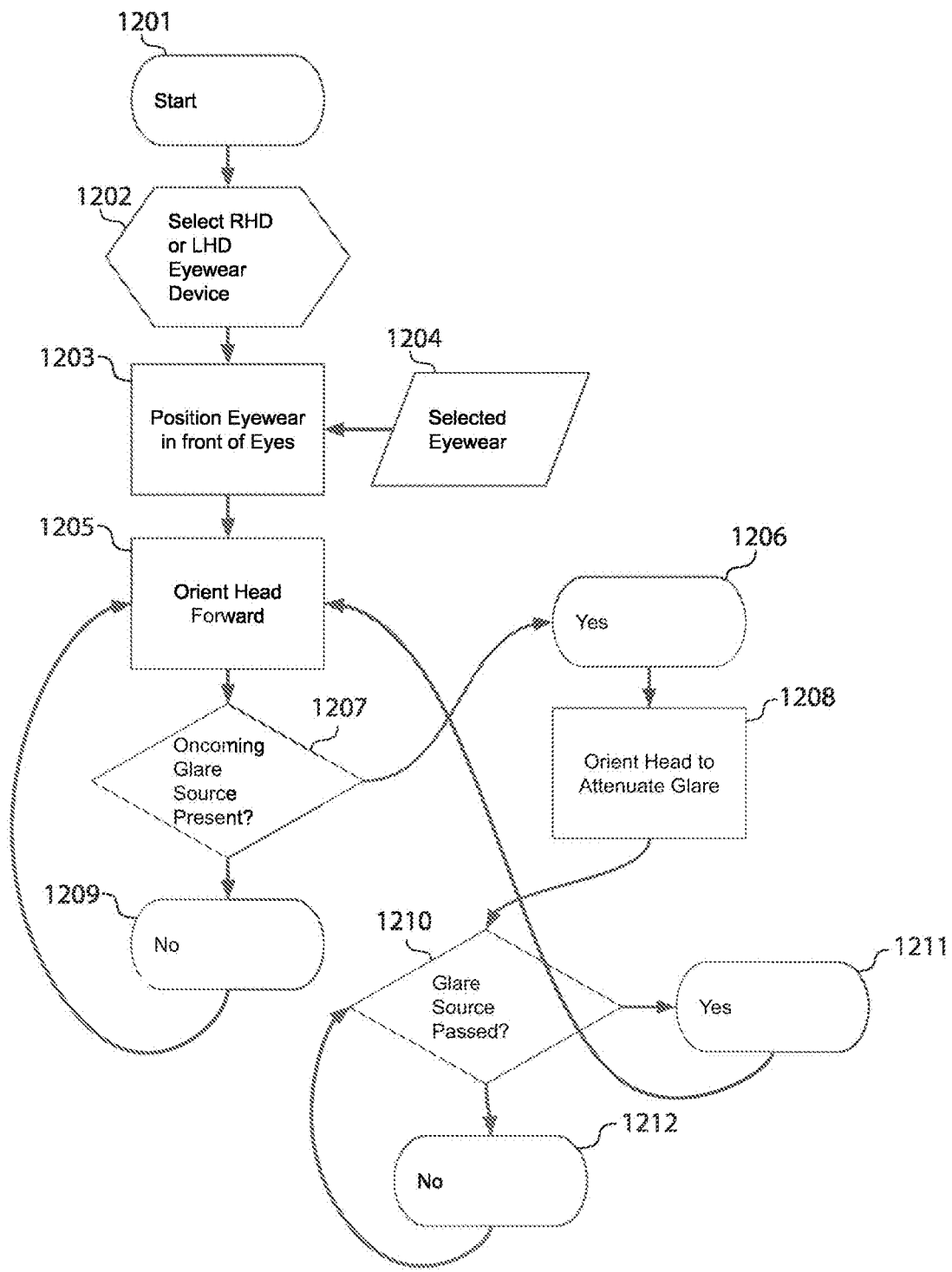
FIG. 12 is a flow chart depicting an embodiment of a method of using an eyewear device to attenuate glare while driving at night.

FIG. 12 depicts a method of using an eyewear device for reducing glare experienced by a person while driving a car at night. The steps of the method begin at 1201 and proceed to a first decision point 1202 wherein an eyewear device that is configured for use with a desired roadway system is selected. Types of roadway systems may include geometrical considerations such as road width, which side of the road traffic drives upon, and the amount of roadway lighting provided by the headlights of other cars or by streetlights.

In some embodiments of the method, an eyewear device may be configured for use on a roadway system where cars drive on the right-hand side of the road, as in the USA and most other countries. In some embodiments of the method, an eyewear device may be configured for use on a roadway system where cars drive on the left-hand side of the road, as in the UK and some other countries.

In some embodiments of the method, an eyewear device may be selected that is configured for use in urban environments including city streets and freeways, where roadways may be wide with multiple lanes of traffic in each direction and are well lit by street lighting. In such embodiments it may be preferable to configure the lenses of the eyewear device to provide an overall greater amount of light attenuation, for example by incorporating a uniformly disposed optical filtering material into the lens substrates that is configured such that a mean spectral transmittance between 430 nanometers to 470 nanometers of the lens substrates is less than or equal to 30 percent, and a mean spectral transmittance between 550 nanometers to 650 nanometers of the lens substrates is greater than or equal to 80 percent.

In some embodiments of the method, the eyewear device may be configured for use in rural environments including country roads and two-lane highways, where roadways are narrow and there is limited street lighting. In such embodiments it may be preferable to configure the lenses of the eyewear device in such a way that the visible light transmittance of the lens substrates is greater than or equal to 85 percent, and the average visible light transmittance in the lower nasal quadrant of the first lens is greater than or equal to 85 percent, and the average visible light transmittance in the lower temporal quadrant of the second lens is greater than or equal to 85 percent. For example, the lens substrates may incorporate substantially no uniformly disposed optical filtering material, or may incorporate only a very small portion of a uniformly disposed optical filtering material so that the visible light transmittance lower bounds listed are provided.

After the selection process is completed the selected eyewear device is provided 1204 which is then positioned in front of the eyes of a person 1203 while the person is driving a car on the desired roadway system during nighttime hours. Initially the person may orient their head and gaze forward 1205 in the normal fashion, however the head and gaze position may be modified from time to time in response to occasional occurrence of bothersome glare events as follows: while looking forward, the driver continuously evaluates their field of view to determine if a bothersome glare source is present or will be imminently present 1207. If no such glare source is present or imminent 1209 then the driver may continue to orient their head and gaze forward in the normal fashion 1205, and the method then continues on in a recurrent loop; however, if a glare source is present or will soon be present 1206 then the driver may engage in a slight rotation of their head to cause a region of the eyewear device lenses wherein the light attenuation is relatively greater to be so rotated that that region intervenes between the glare source and the driver's pupil thereby causing the intensity and/or color of the glare source to be reduced to a comfortable level. During this rotation motion the driver may contra-rotate their eyes to maintain a forward gaze upon the roadway while traveling at speed. Whereas the rotated position of the head is not the most comfortable, the driver may continuously re-evaluate their field of view to determine if and when the glare source has passed 1210; whereby if not 1212 then the rotated position is maintained and the re-evaluation continues in a recurrent fashion, but if so 1211, then the driver may rotate their head and eyes back to the normal forward position 1205, and then proceed again to engaging in a continuous evaluation of the forward field of view for presence or imminent presence of a bothersome glare event e.g. via the loop 1207, 1209, 1205, etc.

The foregoing descriptions of eyewear designed in accordance with the invention and methods of using such eyewear devices are intended to be illustrative examples of one or more embodiments of the invention and are not intended to be limiting. A practitioner skilled in the art of eyewear design and manufacturing will appreciate that eyewear providing substantially equivalent spatially non-uniform spectral transmittance properties may be manufactured using a variety of techniques, such as using masked coating deposition, patterned films, or printing or spraying techniques, and that eyewear lenses may take on a wide variety of shapes including round, rectangular, elongated ovals and non-convex contours featuring notches or cutouts.

This disclosure is illustrative and not limiting. Further modifications will be apparent to one skilled in the art in light of this disclosure. For example, where methods and steps described above indicate certain events occurring in certain order, those of ordinary skill in the art will recognize that the ordering of certain steps may be modified and that such modifications are in accordance with the inventions disclosed herein. Additionally, certain of the steps may be performed concurrently in a parallel process when possible, as well as performed sequentially as described above. Acts referred to herein as operations in a method or process may also be understood as "steps" in the method or process. Therefore, to the extent there are variations of the inventions disclosed herein, which are within the spirit of this disclosure or equivalent to the inventions disclosed herein, it is the intent that this disclosure and the claims it supports will cover those variations as well. All publications and patent applications cited in this disclosure are incorporated herein by reference in their entirety as if each individual publication or patent application were specifically and individually put forth herein.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

Calculations required to implement any of the manufacturing and/or design methods disclosed herein and/or sub-processes within any such methods may be performed, for example, on a computer having 3.2 GHz 6-Core Intel Core i7 processor and 64 GB of RAM using the open source Julia programming language. Spectrophotometric measurements may be performed, for example, using an Ocean Optics USB4000 spectrophotometer and collected using the Ocean View application available from Ocean Optics, Inc. It should be understood by those of ordinary skill in the art that the methods disclosed herein are not limited to the above implementation hardware and/or software elements and are independent of the aforementioned computer and/or system architecture. Accordingly, the methods may equally be implemented on other computing platforms, use other computational software (whether commercially available or coded specifically for the filter design methods), and also may be hard-wired into a circuit or other computational component.

What is claimed is:

1. A spectacle eyewear device for night-time driving comprising:
   a first lens;
   a second lens;
   a spectacle frame; and,
   wherein the first lens and the second lens each comprise a lens substrate, an optical filtering material, a gradient axis, an optical center, an upper nasal quadrant, a lower nasal quadrant, a lower temporal quadrant, and an upper temporal quadrant; and,
   i) the optical filtering materials are gradiently disposed across each lens along a gradient axis such that the maximum change in visible light transmittance along the gradient axis is between 100 to 400 basis points per millimeter;
   ii) the first lens is mounted in the spectacle frame in such a way that the gradient axis is oriented between 10 degrees to 30 degrees away from the vertical axis of the lens; and, an average visible light transmittance in the upper temporal quadrant of the lens is less than or equal to 30 percent; and, an average visible light transmittance in the lower nasal quadrant of the lens is greater than or equal to 70 percent,
   iii) the second lens is mounted in the spectacle frame in such a way that the gradient axis is oriented substantially parallel to the gradient axis of the first lens; and, an average visible light transmittance in the upper nasal quadrant of the lens is less than or equal to 30 percent; and, an average visible light transmittance in the lower temporal quadrant of the lens is greater than or equal to 70 percent.

2. The eyewear device of claim 1, wherein the gradiently disposed optical filtering materials of each lens are configured such that:
   i) an average mean spectral transmittance between 430 nanometers to 470 nanometers in the upper temporal quadrant of the first lens is less than or equal to 20 percent; and, an average mean spectral transmittance between 550 nanometers to 650 nanometers in the lower nasal quadrant of the first lens is greater than or equal to 80 percent; and,
   ii) an average mean spectral transmittance between 430 nanometers to 470 nanometers in the upper nasal quadrant of the first lens is less than or equal to 20 percent; and, an average mean spectral transmittance between 550 nanometers to 650 nanometers in the lower temporal quadrant of the first lens is greater than or equal to 80 percent.

3. The eyewear device of claim 2, wherein the lens substrates each comprise a uniformly disposed optical filtering material that is configured such that a mean spectral transmittance between 430 nanometers to 470 nanometers of the lens substrates is less than or equal to 30 percent and a mean spectral transmittance between 550 nanometers to 650 nanometers of the lens substrates is greater than or equal to 80 percent.

4. The eyewear device of claim 3, wherein the lower temporal quadrant of the first lens comprises a selectively disposed blue-light reflective coating within a region upon the convex surface of the lens wherein the blue-light reflective coating has a mean spectral reflectance between 430 nanometers to 470 nanometers that is greater than 30 percent and has a mean spectral reflectance between 550 nanometers to 650 nanometers that is less than 15 percent.

5. The eyewear device of claim 4, wherein the lower nasal quadrant of the second lens comprises a selectively disposed blue-light reflective coating within a region upon the convex surface of the lens wherein the blue-light reflective coating has a mean spectral reflectance between 430 nanometers to 470 nanometers that is greater than 30 percent and has a mean spectral reflectance between 550 nanometers to 650 nanometers that is less than 15 percent.

6. The eyewear device of claim 2, wherein the lower temporal quadrant of the first lens comprises a selectively disposed blue-light reflective coating within a region upon the convex surface of the lens wherein the blue-light reflective coating has a mean spectral reflectance between 430 nanometers to 470 nanometers that is greater than 30 percent and has a mean spectral reflectance between 550 nanometers to 650 nanometers that is less than 15 percent.

7. The eyewear device of claim 6, wherein the lower nasal quadrant of the second lens comprises a selectively disposed blue-light reflective coating within a region upon the convex surface of the lens wherein the blue-light reflective coating has a mean spectral reflectance between 430 nanometers to 470 nanometers that is greater than 30 percent and has a mean spectral reflectance between 550 nanometers to 650 nanometers that is less than 15 percent.

8. The eyewear device of claim 1, wherein the lower temporal quadrant of the first lens comprises a selectively disposed blue-light reflective coating within a region upon the convex surface of the lens wherein the blue-light reflective coating has a mean spectral reflectance between 430 nanometers to 470 nanometers that is greater than 30 percent and a mean spectral reflectance between 550 nanometers to 650 nanometers that is less than 15 percent.

9. The eyewear device of claim 8, wherein the lower nasal quadrant of the second lens comprises a selectively disposed blue-light reflective coating within a region upon the convex surface of the lens wherein the blue-light reflective coating has a mean spectral reflectance between 430 nanometers to 470 nanometers that is greater than 30 percent and has a mean spectral reflectance between 550 nanometers to 650 nanometers that is less than 15 percent.

10. A method of reducing glare caused by headlights at night experienced while a person is driving a vehicle, the method comprising:
    selecting an eyewear device that is configured for use on a roadway system;
    positioning the eyewear device in front of the person's eyes and simultaneously the person driving a vehicle on the roadway system during nighttime hours and the person engaging in a rotation of the head from time to time to improve quality of vision; and, whereby the engagement of head rotations are performed depending on viewing conditions such that if the person desires to reduce glare experience from headlights then the person rotates their head toward the passenger side of the vehicle, and if the person desires to improve visibility of dark objects in the roadway then the person rotates their head toward the forward direction of the vehicle; and wherein the eyewear device comprises:

a first lens;

a second lens;

a spectacle frame; and, wherein the first lens and the second lens each comprise a lens substrate, an optical filtering material, a gradient axis, an optical center, an upper nasal quadrant, a lower nasal quadrant, a lower temporal quadrant, and an upper temporal quadrant; and, i) the optical filtering materials are gradiently disposed across each lens along a gradient axis such that the maximum change in visible light transmittance along the gradient axis is between 100 to 400 basis points per millimeter;

ii) the first lens is mounted in the spectacle frame in such a way that the gradient axis is oriented between 10 degrees to 30 degrees away from the vertical axis of the lens; and, an average visible light transmittance in the upper temporal quadrant of the first lens is less than or equal to 30 percent; and, an average visible light transmittance in the lower nasal quadrant of the first lens is greater than or equal to 70 percent, iii) the second lens is mounted in the spectacle frame in such a way that the gradient axis is oriented substantially parallel to the gradient axis of the second lens; and, an average visible light transmittance in the upper nasal quadrant of the lens is less than or equal to 30 percent; and, an average visible light transmittance in the lower temporal quadrant of the second lens is greater than or equal to 70 percent.

11. The method of claim 10, wherein the gradiently disposed optical filtering materials of each lens are configured such that:

i) an average mean spectral transmittance between 430 nanometers to 470 nanometers in the upper temporal quadrant of the first lens is less than or equal to 20 percent and an average mean spectral transmittance between 550 nanometers to 650 nanometers in the lower nasal quadrant of the first lens is greater than or equal to 80 percent; and, ii) an average mean spectral transmittance between 430 nanometers to 470 nanometers in the upper nasal quadrant of the first lens is less than or equal to 20 percent and an average mean spectral transmittance between 550 nanometers to 650 nanometers in the lower temporal quadrant of the first lens is greater than or equal to 80 percent.

12. The method of claim 11, wherein the lens substrates of each lens comprise a uniformly disposed optical filtering material that is configured such that a mean spectral transmittance between 430 nanometers to 470 nanometers of the lens substrates is less than or equal to 30 percent, and a mean spectral transmittance between 550 nanometers to 650 nanometers of the lens substrates is greater than or equal to 80 percent.

13. The method of claim 12, wherein the roadway system predominantly consists of wide roadway widths with moderate to high ambient light.

14. The method of claim 11, wherein the lens substrates of each lens comprise a uniformly disposed optical filtering material that is configured such that the visible light transmittance of the lens substrates is greater than or equal to 85 percent, and the average visible light transmittance in the lower nasal quadrant of the first lens is greater than or equal to 85 percent, and the average visible light transmittance in the lower temporal quadrant of the second lens is greater than or equal to 85 percent.

15. The method of claim 14, wherein the roadway system predominantly consists of narrow road widths with minimal street lighting.

16. The method of claim 10, wherein the lens substrates of each lens comprise a uniformly disposed optical filtering material that is configured such that a mean spectral transmittance between 430 nanometers to 470 nanometers of the lens substrates is less than or equal to 30 percent, and a mean spectral transmittance between 550 nanometers to 650 nanometers of the lens substrates is greater than or equal to 80 percent.

17. The method of claim 16, wherein the roadway system predominantly consists of wide roadway widths with moderate to high ambient light.

18. The method of claim 10, wherein the lens substrates of each lens comprise a uniformly disposed optical filtering material that is configured such that the visible light transmittance of the lens substrates is greater than or equal to 85 percent, and the average visible light transmittance in the lower nasal quadrant of the first lens is greater than or equal to 85 percent, and the average visible light transmittance in the lower temporal quadrant of the second lens is greater than or equal to 85 percent.

19. The method of claim 18, wherein the roadway system predominantly consists of narrow road widths with minimal street lighting.

* * * * *